United States Patent
Fridman-Mintz

(10) Patent No.: US 9,460,707 B1
(45) Date of Patent: *Oct. 4, 2016

(54) METHOD AND APPARATUS FOR ELECTRONICALLY RECOGNIZING A SERIES OF WORDS BASED ON SYLLABLE-DEFINING BEATS

(71) Applicant: Boris Fridman-Mintz, Mexico City (MX)

(72) Inventor: Boris Fridman-Mintz, Mexico City (MX)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,671

(22) Filed: Sep. 25, 2015

Related U.S. Application Data

(63) Continuation of application No. 13/767,987, filed on Feb. 15, 2013, now Pat. No. 9,147,393.

(51) Int. Cl.
| | |
|---|---|
| *G10L 13/08* | (2013.01) |
| *G10L 13/00* | (2006.01) |
| *G10L 15/00* | (2013.01) |
| *G10L 15/04* | (2013.01) |
| *G10L 25/18* | (2013.01) |

(52) U.S. Cl.
CPC .............. *G10L 15/04* (2013.01); *G10L 25/18* (2013.01)

(58) Field of Classification Search
None
See application file for complete search history.

(56) References Cited

U.S. PATENT DOCUMENTS

| | | | |
|---|---|---|---|
| 7,010,489 B1 | 3/2006 | Lewis et al. | |
| 8,301,443 B2 | 10/2012 | Angell et al. | |
| 8,401,849 B2 | 3/2013 | Chandra et al. | |
| 8,626,505 B2 | 1/2014 | Angell et al. | |
| 9,147,393 B1 * | 9/2015 | Fridman-Mintz | G10L 15/04 |
| 2005/0125227 A1 | 6/2005 | Kamai et al. | |
| 2009/0326951 A1 | 12/2009 | Morinaka et al. | |
| 2010/0088089 A1 | 4/2010 | Hardwick | |
| 2011/0166861 A1 | 7/2011 | Wang et al. | |
| 2012/0191457 A1 | 7/2012 | Minnis et al. | |
| 2013/0144626 A1 | 6/2013 | Shau | |
| 2013/0226569 A1 | 8/2013 | Chandra et al. | |
| 2013/0304459 A1 | 11/2013 | Pontoppidan et al. | |

OTHER PUBLICATIONS

Johnson, R.E. and Liddell, S.K.; Toward a Phonetic Representation of Signs: Sequentiality and Contrast; Sign Language Studies, vol. 11, No. 2; Winter 2010; pp. 241-274.

Johnson, R.E. and Liddell, S.K.; A Segmental Framework for Representing Signs Phonetically; Sign Language Studies, vol. 11, No. 3; Spring 2011; pp. 408-463.

(Continued)

*Primary Examiner* — Satwant Singh
(74) *Attorney, Agent, or Firm* — Louis J. Hoffman

(57) ABSTRACT

Speech is modeled as a cognitively-driven sensory-motor activity where the form of speech is the result of categorization processes that any given subject recreates by focusing on creating sound patterns that are represented by syllables. These syllables are then combined in characteristic patterns to form words, which are in turn, combined in characteristic patterns to form utterances. A speech recognition process first identifies syllables in an electronic waveform representing ongoing speech. The pattern of syllables is then deconstructed into a standard form that is used to identify words. The words are then concatenated to identify an utterance. Similarly, a speech synthesis process converts written words into patterns of syllables. The pattern of syllables is then processed to produce the characteristic rhythmic sound of naturally spoken words. The words are then assembled into an utterance which is also processed to produce a natural sounding speech.

14 Claims, 14 Drawing Sheets

(56) References Cited

OTHER PUBLICATIONS

Browman, C.P. and Goldstein, L.; Competing constraints on intergestural coordination and self-organization of phonological structures; Institut de la Communication Parlee; Bulletin No. 5; 2000; pp. 25-34.

Nam, H., et al.; Self-organization of Syllable Structure: A Coupled Oscillator Model; Approaches to Phonological Complexity; Berlin, New York: Mouton de Gruyter 2009.

Saltzman, E. et al.; A task-dynamic toolkit for modeling the effects of prosodic structure on articulation; Proceedings of the 4th International Conference on Speech Prosody (Speech Prosody 2008), Campinas, Brazil; May 6-9, 2008; pp. 175-184.

Byrd, D. et al.; Timing effects of syllable structure and stress on nasals: a realtime MRI examination; Journal of Phonetics; vol. 37, Issue 1, Jan. 2009, pp. 97-110.

Fridman-Mintz, Boris; Tense and Aspect Inflections in Mexican Sign Language Verbs; Dissertation submitted to Graduate School of Arts and Sciences of Georgetown University; Oct. 28, 2005.

Rothenberg, Martin; Voice Onset Time vs. Articulatory Modeling for Stop Consonants; Journal Logopedics Phoniatrics Vocology, vol. 34; 2009; pp. 171-180.

Fridman-Mintz, Boris; De la naturaleza gestual de la oralidad: fonética cognoscitiva; Antropologia Boletín Oficial del Instituto Nacional de Antropologia e Historia. Nueva Época. No. 47. 2009; pp. 122-143.

* cited by examiner

FIG. 2A
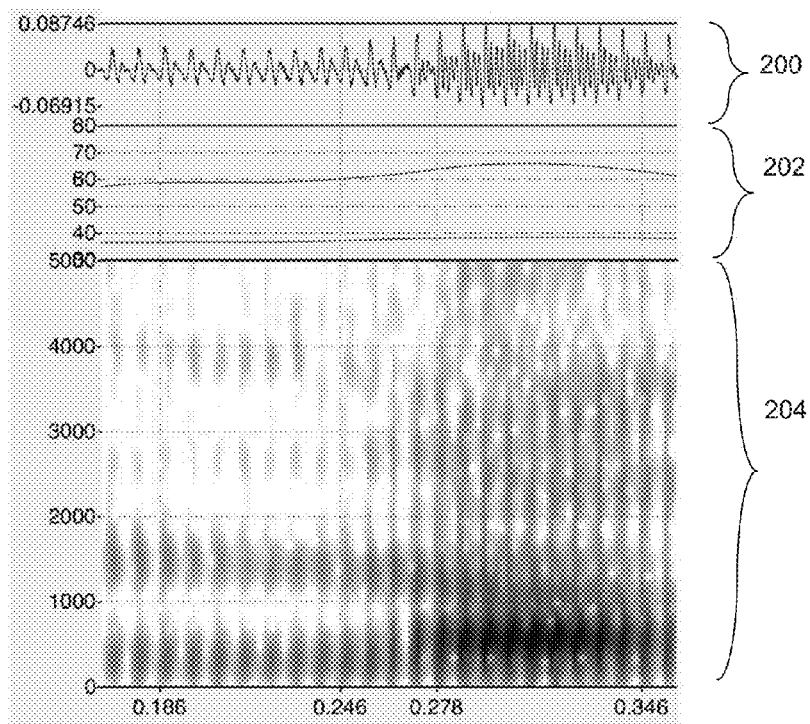
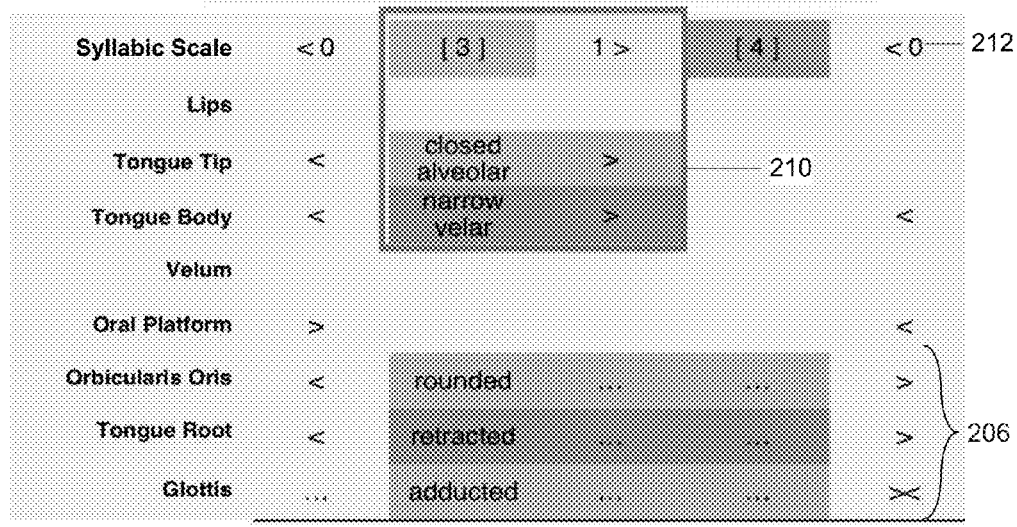
FIG. 2B

METHOD AND APPARATUS FOR ELECTRONICALLY RECOGNIZING A SERIES OF WORDS BASED ON SYLLABLE-DEFINING BEATS

CROSS-REFERENCE TO RELATED APPLICATIONS

This application is a continuation of application Ser. No. 13/767,987, filed Feb. 15, 2013, now U.S. Pat. No. 9,147,393.

BACKGROUND

Speech recognition technology converts words spoken by arbitrary speakers into written text. This technology has many uses, such as voice control applications including voice dialing, call routing and appliance control, and other applications, such as searching audio recordings, data entry, document preparation and speech-to-text processing.

Speech synthesis technology produces audible human speech by artificial means, such as a speech synthesizer. A variant of this technology, called a "text-to-speech system", converts written normal language text into audible speech. Synthesized speech can be created by concatenating sound patterns, representations of which are stored in a database. The representations are retrieved from the database and combined in different patterns to drive a speaker system that produces the audible speech. Alternatively, a speech synthesizer can incorporate a model of the vocal tract and other human voice characteristics which can be driven by the stored representations to create a completely "synthetic" speech output.

Speech recognition and speech synthesis technologies are based on underlying models of human speech. Current prior art speech synthesis and speech recognition systems are built upon one of two theoretical models or an eclectic combination of the two models. In accordance with the first or "segmental" model, speech can be produced by linearly arranging short sound segments called "phones" or "phonemes" to form spoken words or sentences. Therefore, it should be possible to exhaustively pair a particular sound segment arrangement with a corresponding chain of alphabetic letters. However, this goal has proven to be elusive; when such sound segments are stored in a database and retrieved in accordance with alphabetic chains to synthesize speech, the resulting speech is often unclear and "artificial" sounding. Similarly, breaking speech into these segments and combining them to look for a corresponding word in a database produces many incorrect words. Accordingly, other approaches statistically exploit correlations of scattered features and interspersed (nonexhaustive) acoustic segments for speech recognition and synthesis.

In accordance with a prior art second or "articulatory phonology" model, speech is modeled as the result of a series of ongoing and simultaneous "gestures". Each gesture is a modification of the human vocal tract produced by specific neuro-muscular systems and is classified by the anatomical structures that together produce that gesture. These structures are lips, tongue tip, tongue body, velum (together with nasal cavities) and glottis. Since these gestures may have different temporal spans, the challenge for this approach has been to systematically account for their synchronization. This is typically done by defining "phases" between gestures, but the exact determination of these phases has only been achieved on an ad hoc basis. Hence, "constellation" or "molecule" metaphors are used to bundle gestures together as a basis for speech synthesis.

None of the prior art approaches have provided a systematic and accurate model from which speech synthesis and speech recognition systems can be developed.

SUMMARY

In accordance with the principles of the present invention, speech is modeled as a cognitively-driven sensory-motor activity where the form of speech (the phonetic or phonological pole of language) is the result of categorization processes that any given subject (speaker or listener) recreates by focusing on linguistic activity with the goals of mastering the production of his or her own fine-tuned vocal tract gestures, and the recognition of such gestures produced by others. In particular, subjects focus on creating or replicating sound patterns that are represented by syllables. These syllables are then combined in characteristic patterns to form words, which are in turn, combined in characteristic patterns to form utterances.

A speech recognition process constructed in accordance with the principles of the invention first identifies syllables in an electronic waveform representing ongoing speech. The pattern of syllables is then deconstructed into a standard form that is used to identify words. The words are then concatenated to identify an utterance.

Similarly, a speech synthesis process constructed in accordance with the principles of the invention converts written words into patterns of syllables. The pattern of syllables is then processed to produce the characteristic rhythmic sound of naturally spoken words. The words are then assembled into an utterance which is also processed to produce a natural sounding speech.

BRIEF DESCRIPTION OF THE DRAWINGS

FIG. 2A is an oscillogram, a graph of intensity or amplitude and a sonogram of a speaker speaking the Spanish syllable [lo] versus time.

FIG. 2B shows the synsyllabic schema, syllabic nucleus, onset schema and syllable prominence scale for the syllable shown in FIG. 2A.

DETAILED DESCRIPTION

Figure 1A:
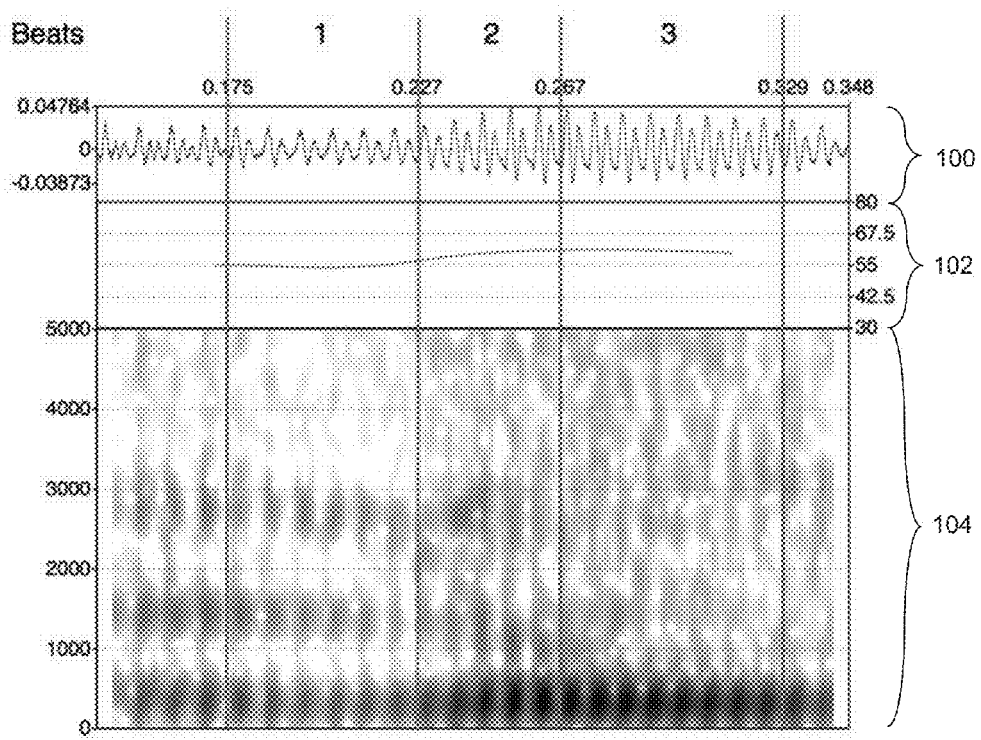
FIG. 1A is an oscillogram, a graph of intensity or amplitude and a sonogram of a speaker speaking the Spanish syllable [lu] versus time.

In all languages, the processes of categorization are built around syllables, which are basic speech units that allow the autonomous sensory-motor complex routines in a subject's brain to divide ongoing speech into segments, and to determine correspondences amongst these segments. Although syllables are produced by these sensory-motor complex routines as interlocked gestures of variable durations, they can be segmented by laymen and analysts alike, in all languages. This is so, because, syllables are combinations of gestures that are precisely synchronized. More specifically, each syllable begins with a stable or unchanging gesture called a "posture" and ends with another posture.

Syllable timing is measured in "beats". A beat is the conceived execution time of a complex synchronization of gestures, be it of postures or of a mixture of postures with changing gestures in between these postures. This timing is controlled by the central nervous system, which always integrates syllable beats with a characteristic rhythm called a "syllable scale" as described below. Some syllables, traditionally known as "one vowel" syllables, are composed of only one posture and therefore have only one postural beat. All other syllables must include at least one transitional beat, or "transition" between initial and final postures. This transitional beat is a time unit in which at least one gestural component undergoes change. Syllables may have up to fifteen beats, depending on the language, constituted by up to eight postural beats alternating with up to seven transitional beats. The segmentation of beats allows a systematic and exhaustive correlation of articulatory patterns with acoustic patterns where each gestural (articulatory) posture is correlated with stable acoustic properties called "postural spectra" and the properties of all transitions are explained and determined by their surrounding postural beats.

As mentioned above, "gestures" are defined in the prior art articulatory phonology model as a goal-oriented activity of coordinative structures produced by specific neuro-muscular systems working together to generate sound. This conventional model defines each gesture as an indivisible unit that can be modeled by a simple harmonic oscillator equation and that constitutes the goal of the aforementioned activity. In contrast, in the present invention, the goal of the activity is constituted by postures, and qualitatively different transitions, lead to, or away from, the goal. Further, in the prior art articulatory phonology model all gestures produce constrictions in the vocal tract, albeit in varying degrees: closed, critical, narrow, open. In contrast, in the present invention, gestural sequences or "gestural schemata" are functionally differentiated into gestural schemata that cover whole syllables and produce harmonic sound components and gestural schemata that are exclusively executed at syllable edges and are responsible for the production of inharmonic sound components and the attenuation of harmonic ones.

In order to enable the present invention to cover the articulatory possibilities of all languages, the conventional coordinative structures of lips, tongue tip, tongue body, velum (together with nasal cavities) and glottis have been extended to include the orbicularis oris, tongue root, and oral platform. The oral platform is defined as the parallel degree of lowering or raising of the jaw and the hyoid bone (based on Måns Eriksson definition) and is designated as a coordinative structure that produces only syllabic harmonic sound components.

A synsyllabic schema is defined as a set of stable postures and limited transitions that function as a matrix of passages and obstacles that, for the most part, filter harmonic sounds (for example, retracted or advanced tongue root, low, mid or high oral platform, rounded or extended orbicularis oris). The source of the harmonic sound is an oscillating glottis with a constant fundamental frequency, or pitch (in the case of tonal languages there are at most three separate pitches). The matrix of passages and obstacles functions as a set of diffraction factors that determine the acoustic spectral pattern that characterizes every syllable and that is called a "syllabic spectrum" as explained below.

Every synsyllabic schema continues for as long as the whole syllable in which it is instantiated. In other words, a synsyllabic schema must expand (or contract) to match the number of beats of the syllable in which it is instantiated. As a consequence, syllables and synsyllabic schemata have the same number of maximum beats, which in spoken languages, may only reach up to fifteen. To achieve this expandability/contractibility, the extension of simple gestures through time must be a recurrent property of synsyllabic schemata, that is, within a specific coordinative structure, a single posture expands through a variable number of beats, until the synsyllabic schema ends, or until such schema requires a change to another posture. This expansion is achieved through a cognitive process called "continued activation" (Mintz 2006 PhD dissertation) and is traditionally called "assimilation" or "coarticulation" of segments.

Additionally, a synsyllabic schema must occur by itself for at least one syllable beat, that is, with no concurrent syllable inharmonic sound producing gestures as defined below. The beats during which the synsyllabic schema occurs by itself constitute the "nucleus" of a syllable, and always instantiate a syllable diffracted frequency in its most purely harmonic manner (conventionally referred to as "vowel spectrographic formants"). Therefore, a syllabic nucleus is acoustically defined as the set of beats in a syllable during which the syllable frequency is maximally harmonic (these are conventionally referred to as "nucleic syllable segments" or "vowels"). In all spoken languages, one beat syllabic nuclei are very frequent (conventional called "monophthongs"), three beat nuclei follow in frequency (conventionally called "diphthongs") and two beat nuclei are rather infrequent (conventionally these are non existent as a grammatical category and may consist of glides followed by rounded back vowels, or vice-versa).

Figure 1B:
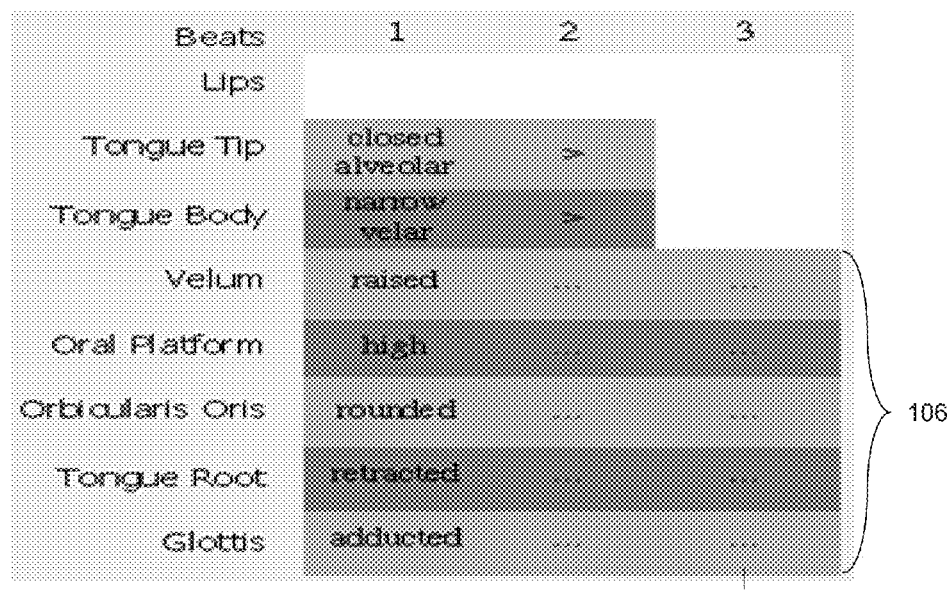
FIG. 1B is a chart of gestures showing the states of the coordinative structures during pronunciation of the syllable shown in FIG. 1A.

FIGS. 1A and 1B show an exemplary synsyllabic schema and syllabic nucleus for the syllable [lu] as pronounced, for example, in the Spanish word lucha (which translates to "fights" in English). In FIG. 1A, the horizontal axis represents time in seconds. The upper portion 100 is an oscillogram of a speaker speaking the syllable and the vertical axis is intensity. The second section 102 is graph of intensity or amplitude where the vertical scale is decibels. The lower section 104 is a sonogram of the speaker where the vertical axis is frequency in Hertz. The amplitude of a particular frequency at a particular time is represented by the gray scale color of each point in the image.

FIG. 1B is a chart of gestures showing the states of the coordinative structures during pronunciation of the syllable. The chosen syllable has three beats indicated by the three rightmost columns in the chart (the first column represents the beginning of pronunciation and is not part of the syllable). Each row of the chart represents one coordinative structure. No symbol in a cell indicates that the coordinative structure of the corresponding row does not participate in the pronunciation of the syllable. In each cell in the chart a "<" symbol indicates that the coordinative structure represented by the row is progressing during the beat represented by the column from a rest state toward a state indicated in a following beat. A ">" symbol indicates that the coordinative structure is progressing from the state indicated in a preceding column to a rest state. A "><" symbol indicates a change in the coordinative structure, but not to a resting state. Finally, a " . . . " symbol indicates continued activation of the corresponding coordinative structure.

Using the definitions above, it can be seen that the synsyllabic schema of this syllable corresponds to the last four rows 106 since only the states in these rows continue for the entire duration of the syllable. However, the syllabic nucleus corresponds only to the last beat represented by the rightmost column 108 because only at this point does the synsyllabic schema occur by itself. The harmonic properties of the syllable can be observed throughout the graphic representations in FIG. 1A, the properties are stable in the first and third beats and change through the second beat.

Edge inharmonic gestures are defined as a conventional sequence of postures and transitions that add constrictions to the passages and obstacles determined by a concurrent synsyllabic schema. As a result one of the following occurs:
1. the added diffraction factors significantly attenuate the amplitude of the harmonic waves. For example, a closed oral cavity with open nasal cavities produces "m" or "n" sounds and a narrow tongue tip-palatal constriction produces the retroflex English "r",
2. a wide range of acoustic frequencies is added through turbulence (tongue body-alveolar ridge critical constriction. This occurs, for example in the "s", "z", or "sh" postures, or
3. the source of harmonic waves is completely eliminated, be it by full closure of air passages as in the "p" or "t" postures, by abducting the glottis as in "s" or "sh" postures or by both means.

As a whole, the result is a mostly inharmonic and an attenuated fragment of syllabic emission, with a diminished or no harmonic output present. Each set of edge inharmonic gestures or "edge inharmonic schema" incorporates a conventional set of diffraction factors that, when added to the diffraction factors of the accompanying synsyllabic harmonic gestures, will produce a conventional and predictable edge spectral pattern. Further, every edge inharmonic schema instantiation must co-occur with a synsyllabic schema and every synsyllabic schema must expand beyond the scope of its accompanying edge inharmonic schema, and the edge inharmonic schema may never extend beyond six beats.

By definition, an edge inharmonic schema is aligned with one edge juncture of a syllable. Either the synsyllabic schema and the edge inharmonic schema begin on the same posture that the synsyllabic schema does, or the edge inharmonic schema ends at the synsyllabic schema final posture, but the edge inharmonic schema may never coincide with both the start and end of the cross-syllable schema. Therefore, there are two types of edge inharmonic schemas, each with slightly different constitutive properties.

An edge inharmonic schema that is synchronized with the beginning of a synsyllabic schema is defined as a syllable "onset schema" (commonly referred to as a set of "syllable initial consonants"). All the coordinative structures that are active on the first beat of a syllable onset schemata must have a given posture value, as part of a syllable-initial beat complex posture, and all these coordinative structures must come to a final transition before, or at the end of, their encompassing syllable onset schema. From an acoustic perceptual perspective, the combination of a particular syllable onset schema with a specific synsyllabic schema will be instantiated by a characteristic combination of syllabic and transitional spectra (discussed below).

FIGS. 2A and 2B show an exemplary synsyllabic schema, syllabic nucleus and onset schema for the syllable [lo] as pronounced, for example, in the Spanish word aloca (which translates to "gets crazy" in English). FIG. 2A shows the same representation as shown in FIG. 1A: the upper portion 200 is an oscillogram of a speaker speaking the syllable, the second section 202 is graph of intensity or amplitude versus time and the lower section 204 is a sonogram of the speaker. FIG. 2B, which is also similar to FIG. 1B, is a chart of gestures showing the states of the coordinative structures during pronunciation of the syllable. The chosen syllable has three beats indicated by the three rightmost columns in the chart and each row of the chart represents one coordinative structure.

As shown in FIG. 2B, the synsyllabic schema of the selected syllable corresponds to the last three rows 206 and the syllabic nucleus corresponds only to the last beat represented by the rightmost column 208. The onset schema corresponds to the cells in the highlighted box 210. Corresponding to the onset schema, the left bands of frequencies on the sonogram 204 are attenuated, as compared to the following darker nucleic stable bands of frequencies.

An edge inharmonic schema that is aligned with the end of a synsyllabic schema is defined as a syllable "coda schema" (commonly known as a set of "syllable final consonants"). All the coordinative structures participating in a coda schema must begin with their respective initial transitions, and all those that end at the syllable's final beat must end at a given posture, within a syllable-final one beat complex posture. From an acoustic perceptual perspective, the combination of a particular syllable coda schema with a specific synsyllabic schema will also be instantiated by a characteristic combination of syllabic and transitional spectra (discussed below).

The above categories can be combined so that speech gestural categories are modeled as sound diffraction factors, and their interaction is systematically correlated with speech spectrum categories by a technique called "speech spectroscopy". This technique allows the cognitive integration of speech motor categories and speech sensory categories, in a holistic model. Speech spectroscopy is described below.

An obstacle to be overcome by this technique is the ongoing change of spectra produced by the word order and intonation caused by unfolding speech with a particular combination of words. The key to resolving this change is the adequate and exhaustive segmentation of syllable beats. During speech, postures occur as non-changing spectra, and therefore can be recognized by spectral analysis. However, transitions and their intrinsically changing properties are determined by their contiguous postures and thus differ depending on the exact speech pattern. Nevertheless, when transitions are properly segmented and contextualized, their relevant transient properties become understandable and identifiable.

The first step in this process is to determine the relevant postures and transitions. Postures and transitions can be recognized and determined from speech acoustic representations (such as oscillographic, numeric, or spectrographic representations) by applying the analytical categories that follow, and by following the corresponding procedures outlined after them.

As previously mentioned, a conceived time for each beat serves as a focal reference for the synchronization of the coordinative structures that produce that beat, with its specifically instantiated posture or transition. Due to its complexity, the unfolding of every complex posture or transition during a beat attracts the focused attention of the subject (speaker or hearer). Additionally, as a sequence of beats is produced, the beats compete for the subject's attention and, following a basic cognitive principle of perceptual organization, one beat will always attract more attention than the other.

Further, an integrated pair of beats, called a "beat complex", will compete for attention with a following beat or beat complex, thus determining the next level in an increasingly complex pattern of attention management, hereafter referred to as a "prominence scale". In other words, a prominence scale (or simply scale) represents a cognitive process of attention management through sensory-motor coordination and is capable of modeling the perception of rhythm in human natural languages.

In all human natural languages, prominence scales have three levels of complexity: syllable scales, word scales, and utterance scales. The units of these scales are observable and measurable, because conceived times run parallel to the degree of committed attention, and both determine the execution time of beats within syllables, syllables within words, and words within utterances.

Beat prominence ($P_b$) may be experimentally measured and is calculated as the multiplication of beat time duration (t) by beat mean intensity (i):

$$P_b = t \times i$$

With this definition, transitions leading from the final posture of one syllable to the initial posture of a following syllable, called "inter-syllabic transitional beats" are defined as having a zero prominence. Although these inter-syllabic transitional beats are indispensable in between syllables, they are always predictable by their syllabic context, and may be deleted from speech representations without perceptible consequences.

As subjects perceive, produce, and compare the syllables of a language, they internally categorize the corresponding onset, syllabic nucleus and coda schemata and the integration of these schemata determine the complex prominence scale of every instantiated syllable and account for its characteristic rhythmic pattern. The central beat of a syllable nucleus is always its most prominent one, the peak of the syllable prominence scale and the one with the highest $P_b$ value. When such nuclei are composed of three beats, the central transitional beat is usually the most prominent one (three beat nuclei are commonly referred to as diphthongs, with a heavy two syllable nucleus). An exemplary syllable prominence scale is represented by the numbers in line 212 of FIG. 2B.

Similarly, as subjects perceive and produce words, they also learn and categorize control patterns of syllable-focused attention through which the syllables forming the words are integrated. The syllables in a word are integrated with a prominence scale called a "word scale". In a word scale, the prominence of each syllable ($P_s$) is calculated as the sum of the beat prominences of the component beats of the syllable ($P_{b1}, P_{b2} \ldots P_{bn}$), divided by the total number of Beats in the syllable(n):

$$P_s = (P_{b1} + P_{b2} + \ldots + P_{bn})/n$$

The stress patterns that characterize the integration of syllables in any word of any language, all abide by this prominence scale which in turn administers a subject's attention through syllable coordination. In addition to operating on a time dimension, this scale follows a set of language universal principles. Each word scale has a syllable that occupies the peak of the scale, having the highest $P_s$ within the word. There is a gradual ascent in syllable prominence towards stressed (peak prominence) syllables. In particular, the degree of syllabic prominence will go one level up with every consecutive syllable, gradually increasing until a syllable with a primary (figure) or secondary stress (figure) is reached. This principle implies that syllables in between two encompassing stressed syllables will always gradually increase towards the last one or gradually decrease until the end of the word or another conventionally located stress (primary or secondary) is encountered.

Similarly, there is a gradual descent in prominence levels following initial single primary stressed syllables. The degree of syllabic prominence will go one level down with every consecutive syllable, departing from an initial primary stress and gradually decreasing until the last syllable of the word is reached. Further, when a stressed syllable functions as the profile determinant of at least one preceding syllable, the syllable immediately following it will go down two levels and initiate a gradual descent until the word's final syllable.

In addition, words may have a second syllabic figure or stress. It is characterized by having a prominence one level below that of the primary stressed syllable and a placement that is not determined by the principle of gradual ascent towards the most prominent syllable.

This cognitively motivated principle seems to account for well documented cases of final syllable weakening and eventual coda or syllable loss. As proposed, this principle implies that the tendency to postpone syllabic profile determination towards the end of words might help to administer articulatory and perceptual attention in order to foster the preservation of the initial most informative sequence of syllables, but at the expense of decreased availability of attention for the syllables that follow the latter sequence. These principles can be incorporated in a process of word identification, through storing and searching of primary and secondary stresses, and their concomitant probabilities of prominence scale sequencing. In a word synthesis process these principles are indispensable for adequate algorithmic rhythm modeling.

Because each word has a characteristic rhythm for a given language, for each word, an array of the syllables included in the word together with the word scale and the written representation of the word can be stored in a word database and used, as discussed below, to identify words in an utterance. The word database can be accessed by the syllables and word scale (for speech recognition) of by the written word representation (for speech synthesis).

In a like manner, as subjects perceive and produce utterances, they also learn and categorize scales through which the words composing the utterance are integrated, following patterns for the control of word-focused attention. These scales are called "utterance scales" and account for the characteristic rhythm of utterances. In an utterance scale, word prominence ($P_w$) is calculated as the sum of the syllable prominences of the syllables ($P_{s1}$, $P_{s2}$ . . . $P_{sn}$) composing a word, divided by the total number of syllables in the word (n):

$$P_w = (P_{s1} + P_{s2} + \ldots + P_{sn})/n$$

Utterance scales always have one word that functions as a peak, with the highest $P_w$ value, constituting the utterance's primary figure. Additionally, utterances may have a secondary figure or degree of prominence in yet another word, which may not be contiguous to the primary figure, and will constitute a secondary figure, by virtue of having the second highest $P_w$ value. The rest of the words in an utterance will constitute a "ground" of the primary and secondary figures, and will gradually decrease in prominence as they depart from them, or vice-versa, will gradually increase in prominence as they approach them. Therefore, when a primary and a secondary figure concur in an utterance scale, the scale values in between the primary and secondary figure will predictably be shaped as a valley.

Figures 3A, 3B:
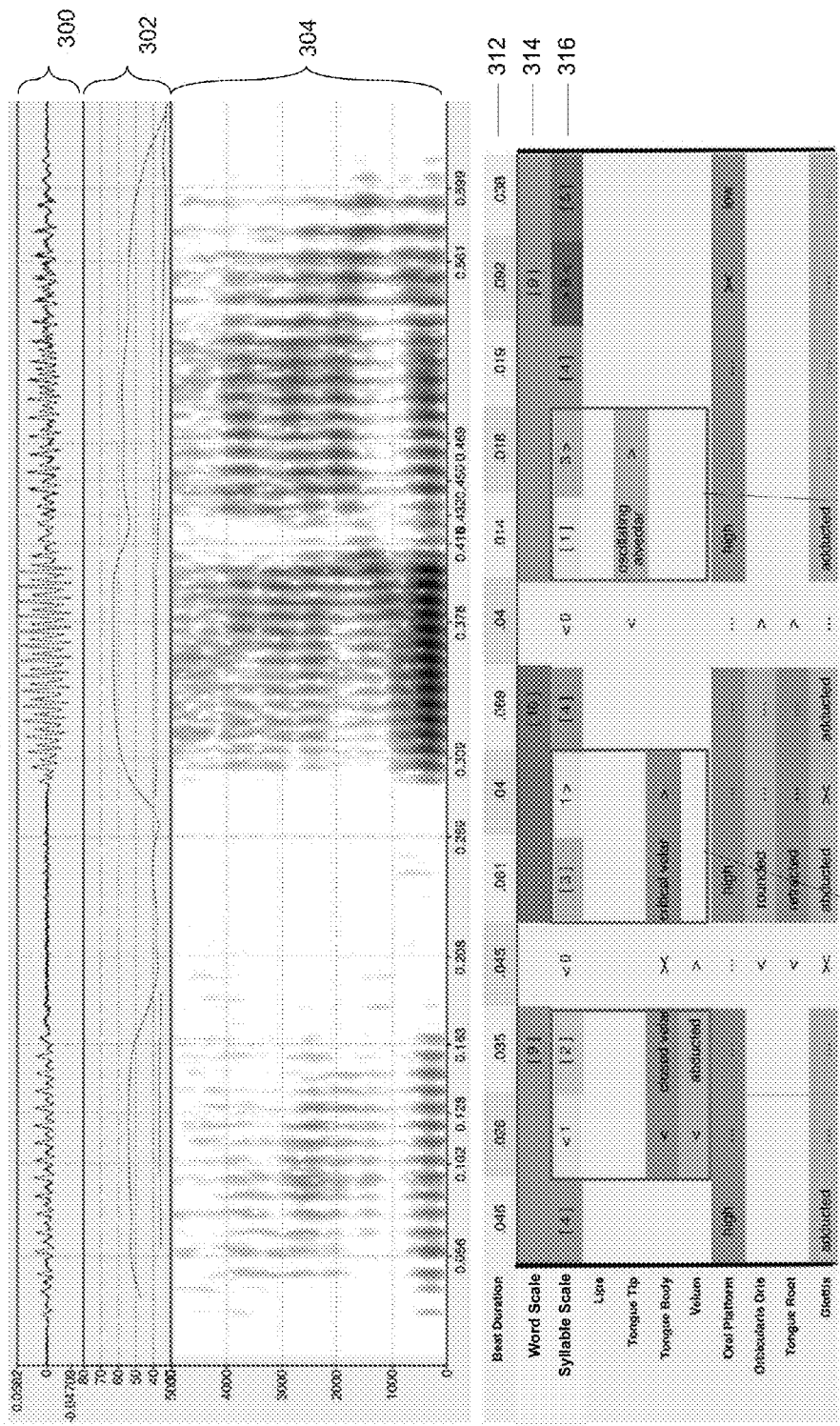
FIG. 3A is an oscillogram, a graph of intensity or amplitude and a sonogram of a speaker speaking the Spanish word injuria.
FIG. 3B is a chart of gestures showing the states of the coordinative structures during pronunciation of the word shown in FIG. 3A, the corresponding edge and synsyllabic schemata, a final three beat syllabic nucleus, the beat durations and the word and syllable scales.

FIGS. 3A and 3B illustrate syllable scales and word scales for the Spanish word injuria (which translates to "insult" in English). As with FIGS. 1A and 1B and 2A and 2B, in FIG. 3A, the upper portion 300 is an oscillogram of a speaker speaking the word, the second section 302 is graph of intensity or amplitude versus time and the lower section 304 is a sonogram of the speaker. FIG. 3B, which is also similar to FIGS. 1B and 2B, is a chart of gestures showing the states of the coordinative structures during pronunciation of the word. The corresponding edge schemata are shown in boxes 306, 308 and 310. The synsyllabic schemata and a final three beat syllabic nucleus (commonly referred to as a "diphthong") are also shown. The beat durations (t) are shown in row 312 and the word scale and syllable scale are represented as the integers in rows 314 and 316, respectively.

Although syllable scales, word scales, and utterance scales can account for the overall rhythm and flow of speech, the specifics of anatomical dimensions and functional potentials for every coordinative structure will vary by subject, and by every spoken utterance. Other conditioning factors, such as bodily posture and proportion, emotional states, etc. also affect speech patterns. In addition, as the prominence scale values change, their corresponding mean intensities modify the frequencies of the uttered waves. Therefore, a technique is needed to filter out these idiosyncrasies so that the linguistic arrangements of frequencies that constitute a normalized spectrum can be identified. This technique involves two steps: one for identifying the most prominent frequencies and a second to normalize these prominent frequencies as explained below.

Within every complex sound wave, the component sine waves will vary in amplitude and frequency. Some frequency waves will have a lower intensity as measured by smaller amplitudes, and will therefore remain in the perceptual base, as "base waves". These background signals remain informative, revealing things such as the subject's probable age, sex, body size, identity, emotional state, surrounding noisy events, etc. but, more importantly, they facilitate the detection of louder and linguistically more important waves.

In particular, for the purpose of syllable identification, the acoustic waves with the larger amplitude will stand out and will attract most of the subject's attention by virtue of being systematically linked to the gestural schema that produces them. Therefore, for any given acoustic spectrum, the n waves with the highest intensity (as measured by the largest amplitude), called "profiled waves", are designated as $W_n$, and their amplitudes as $A_n$. The n profiled waves ($W_n$) are those waves having amplitudes which exceed an amplitude threshold (T) that is defined by:

$$A_n > T \forall n$$

For example, one suitable threshold T is the mean amplitude of all of the waves in the acoustic spectrum.

Figure 4:
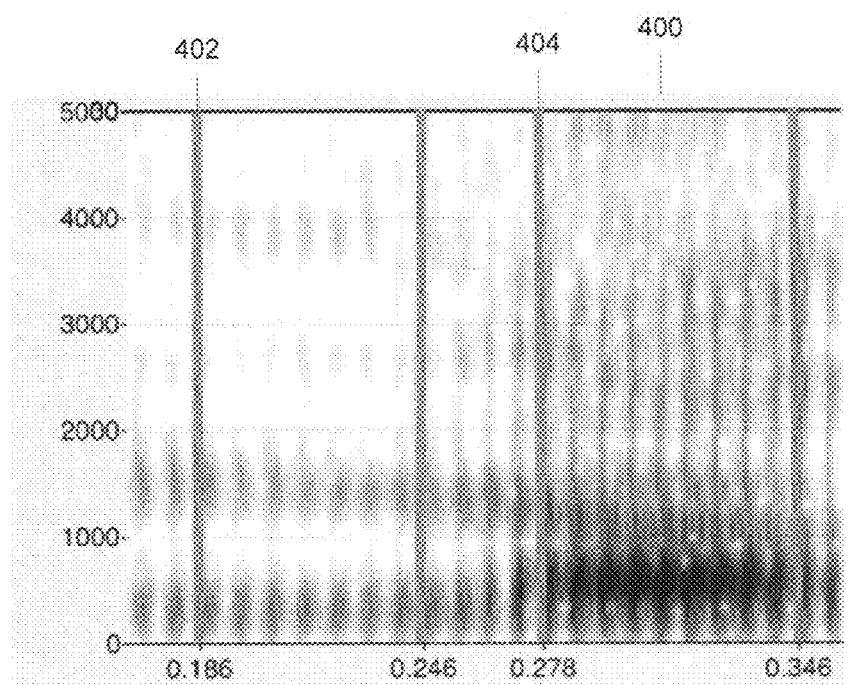
FIG. 4 is an oscillogram representation of a speaker speaking the Spanish Syllable [lu] illustrating profiled waves.

Profiled waves are usually thought of as vowel formants, but they are likewise present as components of inharmonic spectra. This is shown in FIG. 4, which is the oscillogram representation of the Spanish Syllable lu (from the word lucha) taken from section 102 of FIG. 1A. The profiled waves that are traditionally considered vowel formants correspond to the series of darkest sections of consecutive pulses within the rightmost column 400 only. However, profiled waves also correspond to synsyllabic schemata that run throughout the syllable, and change as such schemata intersect with specific edge schemata, as in the postural and transitional beats of the onset schema shown in FIG. 4. Here they correspond to the "l" in the syllable "lu" and occur in the time period from 0.186 (line 402) to 0.278 milliseconds (line 404).

Profiled waves are always perceived as regions of coalescing waves in a given frequency band, rather than as a sum of pure tones. These acoustic regions of coalescing waves constitute a set of frequencies that may be referred to as "posture spectra", and are cognitive categories spoken by all the speakers of a specific linguistic community. Every posture spectra corresponds to a specific postural schema and has three identifying attributes:

a) it is either harmonic or inharmonic,
 b) it has a typical bandwidth that is defined by a high bounding frequency and a low bounding frequency, and,
 c) it has a predictable deviation factor that allows posture spectra that correspond to the same postural schemata, but have different bounding frequencies, to be correlated.

Figure 5:
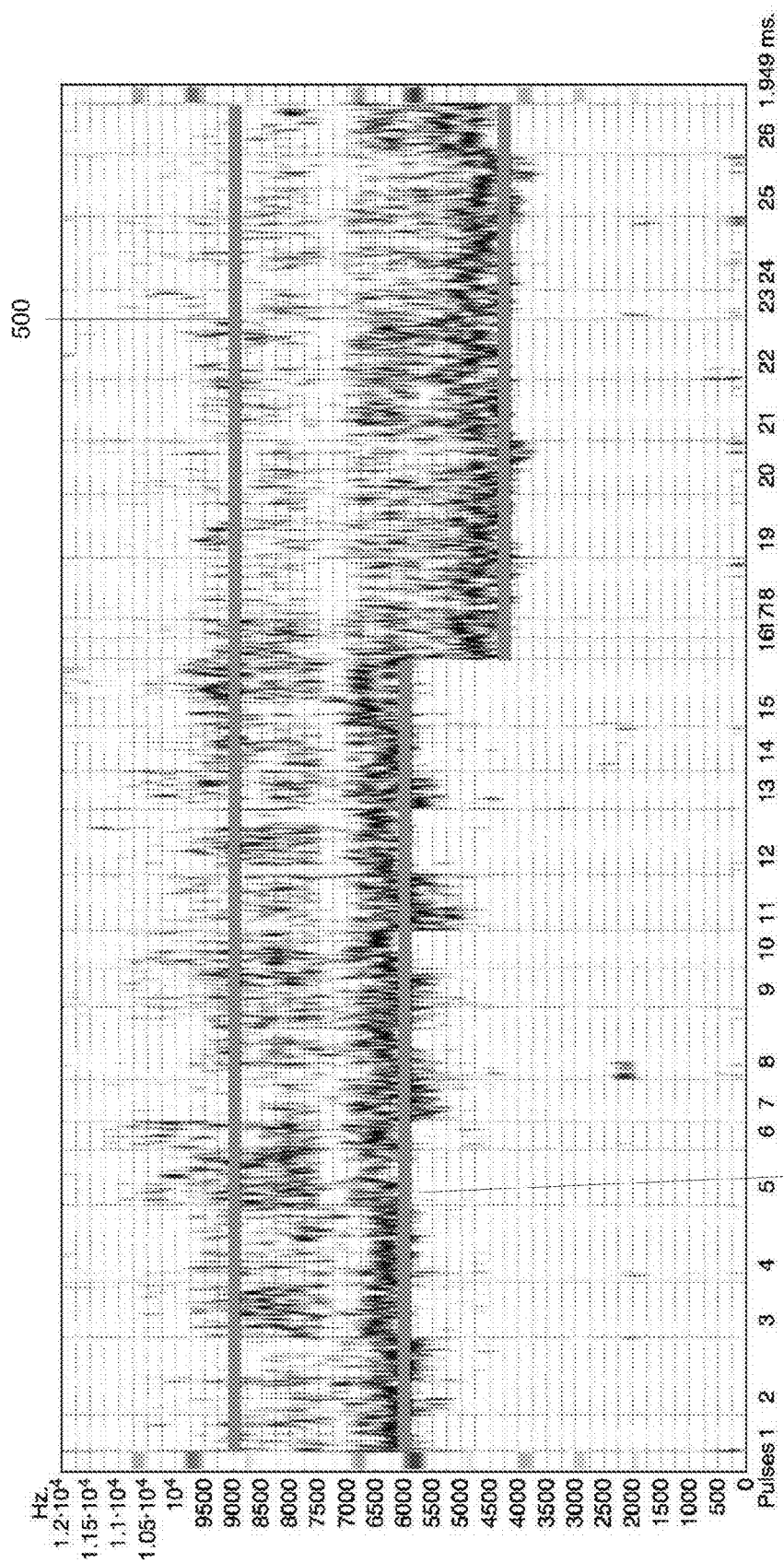
FIG. 5 illustrates twenty-six spectrographic beats corresponding to postures represented by selected letters of twenty-six Spanish words and illustrating upper and lower bounding frequencies.

The bounding frequencies of acoustic regions are obtained by comparing the highest and lowest frequencies shared by all the profiled waves of those acoustic regions, for example, by comparing the spectrographs of a sample of equivalent postural schemata. For example, the Mexican Spanish posture composed of a critical approach of the tongue body towards an alveolar loci, as accompanied by the abduction of the Glottis, is illustrated in FIG. 5. The twenty-six spectrographic beats shown in the figure correspond to the postures roughly represented by the underlined letters of the following written Spanish words: 1) de_s_arrollemos, 2) juda_s_, 3) enla_z_a, 4) toda_s_, 5) naturale_z_a, 6) e_s_tá, 7) _s_ervicio, 8) labore_s_, 9) de_s_nuca, 10) _s_eguimos, 11) _s_emana, 12) come _s_, 13) _s_ervicio, 14) análi_s_is, 15) e_x_igimos, 16) mú_s_ica, 17) abu_s_a, 18) comemo_s_, 19) desarrollamo_s_, 20) dejamo_s_, 21) fallamo_s_, 22) dolo_s_a, 23) fallemo_s_, 24) hallamo_s_, 25) recibimo_s_ and 26) dirigimo_s_.

As shown in FIG. 5, the high bounding frequencies of all the illustrated onset and coda schemata is around the 9,000 Hz. However, the first fifteen postures correspond to onset and coda schemata instantiated within synsyllabic schemata usually represented by the letters a, e and i, and therefore have distinctive 6,000 Hz low bounding frequencies illustrated by line 502, whereas the remaining onset and coda schemata are instantiated within synsyllabic schemata usually represented by the letters u and o and, as a consequence, have 4,250 Hz low bounding frequencies illustrated by line 504. The low bounding frequencies illustrated by line 504 are caused by a widened resonating oral cavity, as configured by the scope of the instantiated synsyllabic schemata, with a retracted tongue root, as well as rounded and protruded lips (notice that the low bounding frequency of the "s" in música indicates that it has been unconventionally integrated as a coda schema of the stressed syllable mús).

Figure 6:
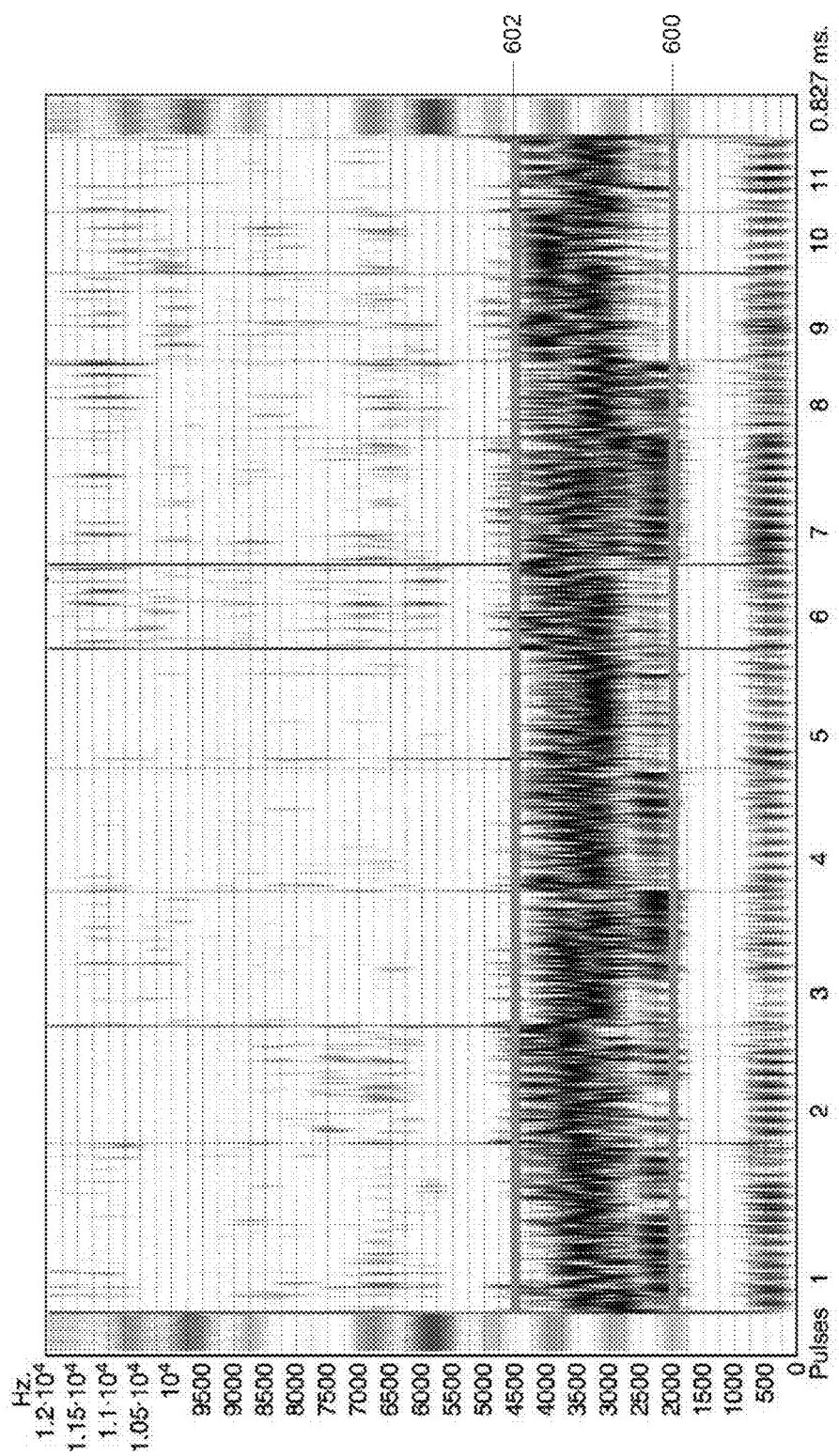
FIG. 6 shows the upper and lower bounding frequencies of eleven spectrographic beats that correspond to the postures represented by the Spanish syllable i in eleven words as uttered by a single Spanish speaking adult male
Figure 7:
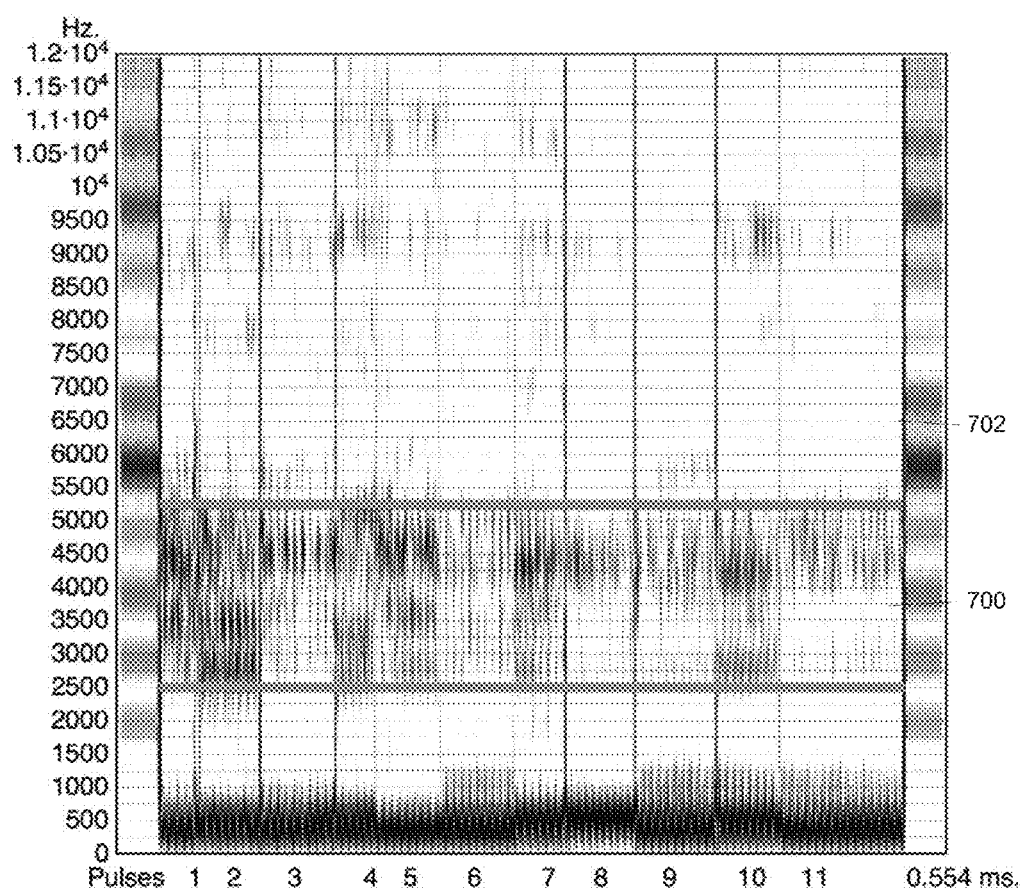
FIG. 7 shows the upper and lower bounding frequencies of eleven spectrographic beats that correspond to the postures represented by the Spanish syllable i in the same eleven words as shown in FIG. 6 as uttered by a single Spanish speaking adult female.

The same procedure can be applied for the recognition of harmonic syllabic nuclei (vowels), as exemplified in FIGS. 6 and 7, both corresponding to a synsyllabic schemata that is commonly represented, in Spanish, by the letter i. FIG. 6 shows spectrographic beats that correspond to the postures roughly represented by the underlined i in the following eleven words, as uttered by a single Spanish speaking adult male: 1) recib_i_mos, 2) serv_i_cio, 3) segu_i_mos, 4) all_í_ está, 5) call_i_to, 6) gall_i_na, 7) sal_i_da, 8) am_i_go, 9) cam_i_no, 10) fam_i_lia and 11) conten_i_do. This harmonic posture spectrum is characterized by a well defined low bounding frequency at 2,000 Hz (illustrated as line 600) and a well-defined high bounding frequency at 4,500 Hz (illustrated as line 602).

FIG. 7 shows spectrographic beats that correspond to the postures roughly represented by the underlined i in the same words as in FIG. 6, as uttered by a single Spanish speaking adult female: 1) recib_i_mos, 2) serv_i_cio, 3) segu_i_mos, 4) all_í_ está, 5) call_i_to, 6) gall_i_na, 7) sal_i_da, 8) am_i_go, 9) cam_i_no, 10) fam_i_lia and 11) conten_i_do. FIG. 7 thus contains an equivalent posture spectrum, but has a low bounding frequency of 2,500 Hz (illustrated as line 700) and a high bounding frequency of 5,250 Hz (illustrated by line 702). Yet, most speakers (and analysts) would recognize both posture spectra as examples of an "i like" posture.

The differing bounding frequencies characterizing a single posture spectrum can be rescaled by a factor which depends on the perceived pitch of the speaker. The male uttering the sampled words of FIG. 6 has a mean pitch of 128 Hz, whereas the words uttered by the female in FIG. 7 have a mean pitch of 198 Hz. The division of the female bounding frequencies by their corresponding mean pitch gives the following rounded results:

$5{,}250/198 = 26.5$ $2{,}500/198 = 12.6$ and the division of the male bounding frequencies by their corresponding mean pitch gives the following rounded results:

$4{,}500/128 = 35.1$ $2{,}000/128 = 15.6$

These differing resealed bounding frequencies characterizing a single posture spectrum can be made comparable by resealing them by an additional deviation factor, which is predominantly determined by the body proportions of the speakers (as instantiated by their vocal and auditory organs). Since pitch and body proportions are generally highly correlated, this deviation factor can be determined from measurements of speech acoustic data. In particular, by determining the bounding frequencies outlined above with respect to FIGS. 6 and 7 for a variety of subjects, a set of deviation factors can be determined by regression analysis. This analysis results in a linguistic perception curve similar to that shown in FIG. 8B in which the vertical scale is mean pitch and the horizontal scale is the deviation factor.

Using this curve, it can be seen that it is necessary to rescale the male pitch by an additional deviation factor of 1.3:

$4{,}500/(128*1.3) = 27.0$ $2{,}000/(128*1.3) = 12.0$

This leads to quite similar proportional representations for the two sets of bounding frequencies, as part of a single posture spectrum that corresponds to the normal perception of their generic "i" identity:

Female i pitch proportion 26.5/12.6
Male i rescaled pitch proportion 27.0/12.0

Therefore, each posture schema for a particular language can be represented by the upper and lower bounding frequencies of profiled waves in the corresponding posture spectrum. The frequencies can be determined by examining, for example, spectrographs of different speakers, such as those shown in FIGS. 6 and 7 to determine the bounding frequencies. These frequencies are then "normalized" by dividing them by the mean pitch of the waves in each spectrographic beat and applying the deviation factor shown in FIG. 8B.

When postures change, one or more of the coordinative structures that participate in a transition must undergo conventionally significant changes, by definition, as determined by the adjacent postures, this causes the bounding frequencies to change leading from the bounding frequencies of one posture, to those of the following one. The directionality and predictability of the properties of these acoustic changes or transitional linguistic spectra vary, depending on the nature of the motor activity that produces them.

Figure 8A:
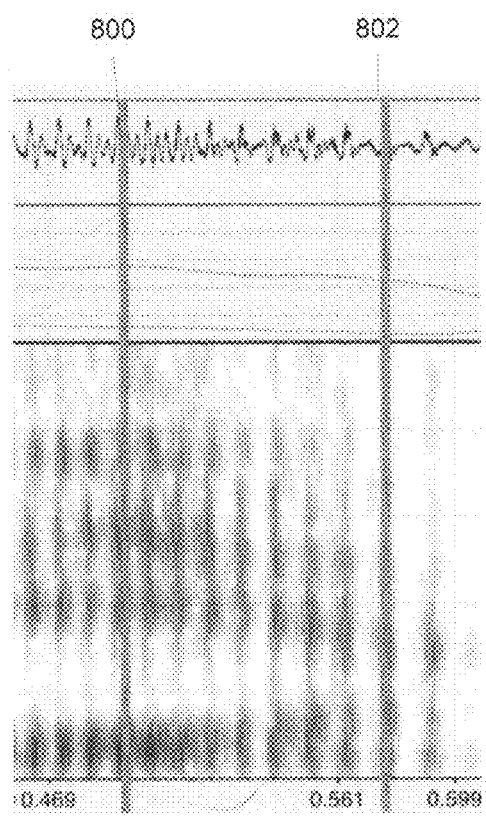
FIG. 8A is an oscillogram, a graph of intensity or amplitude and a sonogram of the transitional spectrum contained by the syllable [ria], extracted from the Spanish word injuria as instantiated in FIG. 3A.
Figure 8B:
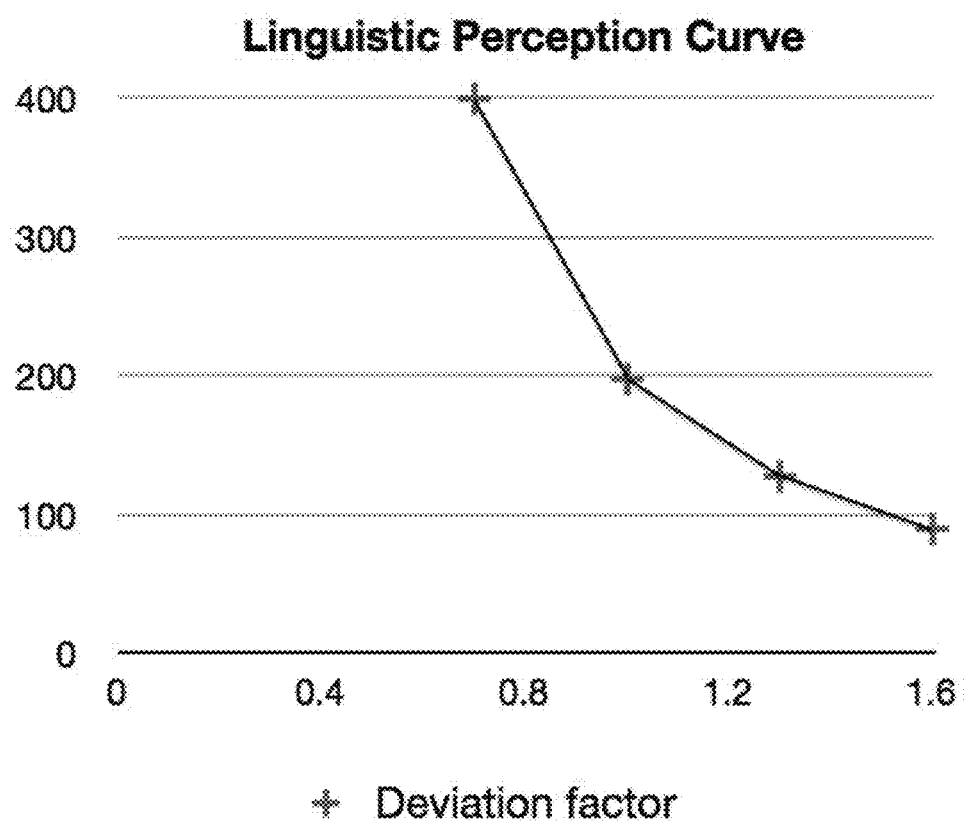
FIG. 8B is a linguistic perception curve illustrating a deviation factor used to adjust the upper and lower bounding frequencies.

In some cases, the changes in motor activity occur gradually, as part of carefully controlled contractions of the speaker's agonist and antagonist muscles. As a consequence, the bounding frequencies will increase or decrease at a steady pace, as part of a characteristic linguistic shifting spectra. Although linguistic shifting spectra may occupy the lowest positions in syllabic scales, whenever a transition has a beat prominence larger than one or both of its neighboring postures it will necessarily be a shifting linguistic spectrum. This is illustrated in FIG. 8A which shows a transitional spectrum (between lines 800 and 802) at the centre of the diphthong syllable [ria], in an instantiation of the Spanish word injuria (illustrated in FIG. 3A). Whereas the lowest and highest profiled waves slightly increase their frequencies (F0 and F3), in the mid range, the second and third profiled waves steadily go down (F1 and F2).

Other changes in motor activity also occur gradually, as part of carefully controlled contractions of the agonist and antagonist muscles. However, their changing bounding frequencies increase or decrease by steps, leading to characteristic linguistic scaffolded spectra. Unlike shifting spectra, scaffolded spectra may never function as syllabic nuclei, that is, they may never assume the peak of the syllabic prominence scale.

Figure 9:
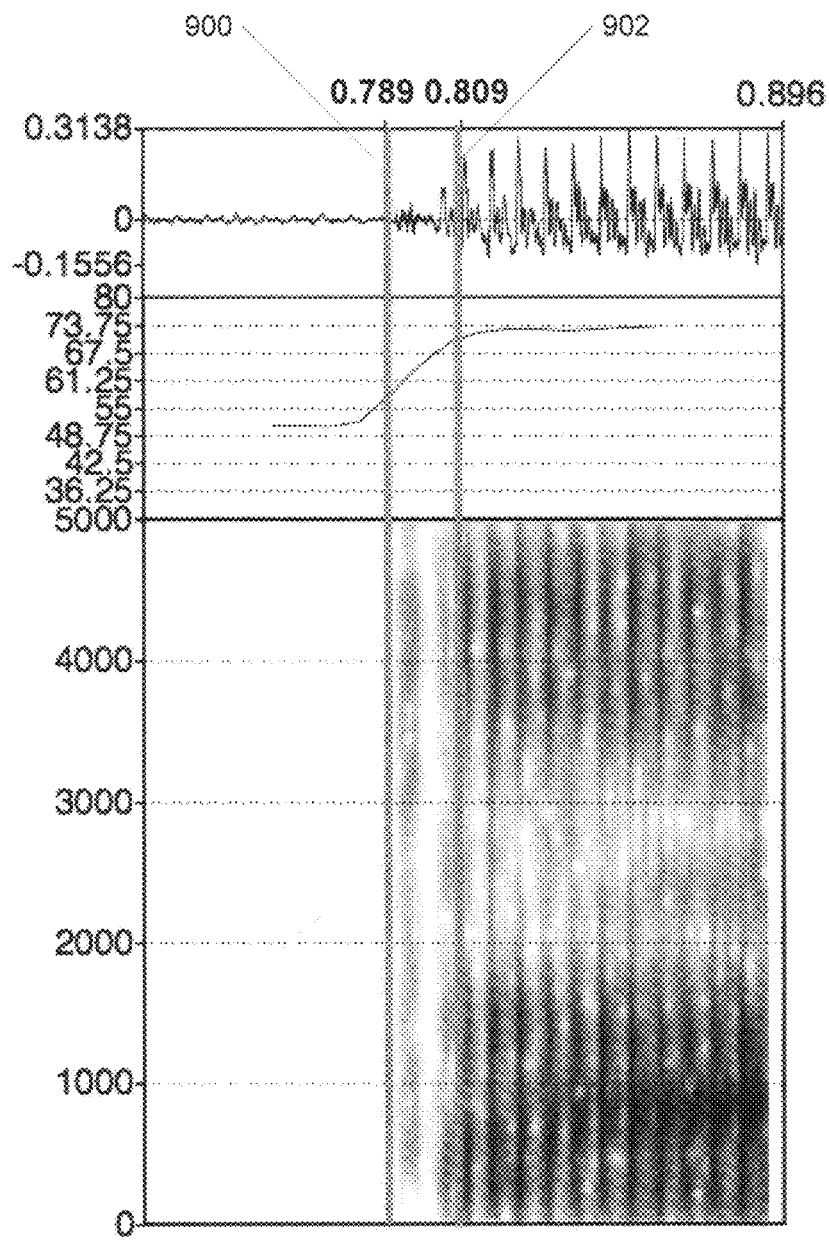
FIG. 9 is an oscillogram, a graph of intensity or amplitude and a sonogram showing a transitional spectrum between the characteristic initial and final postures of the syllable [ta], in an instantiation of the Spanish Word mota.

When changes in motor activity occur as fast as possible, they result in sudden muscular contractions, or "plosions", with an internal timing that is perceived by a speaker or listener as punctual and practically instantaneous. As a consequence, only transient profiled waves and bounding frequencies may be identified, if any are identified at all. The actual duration of such transient spectra will tend to be minimal, and they will always occupy the lowest positions in the syllabic scale. This is illustrated in FIG. 9 which between lines 900 and 902 shows a transitional spectrum between the characteristic initial and final postures of the syllable [ta], in an instantiation of the Spanish Word mota, which translates to the English word "pot".

These changing posture bounding frequencies along with the bounding frequencies for posture schemas are then used to construct syllable arrays. Each syllable array contains the normalized bounding frequencies corresponding to the onset schemata, the synsyllabic schemata and the coda schemata for the syllable along with the appropriate beat prominence scale. The syllable arrays are then stored in a syllable database. Also stored with each syllable array is an indication of with the corresponding language and a written representation of the syllable in that language (called a "tag"). The syllable database can be accessed either by the bounding frequencies (for speech recognition) or by the tag (for speech synthesis).

As syllables are instantiated, they are concatenated into words, and, in turn, into utterances, and their instantiations follow a process of rhythmic integration (similar, for example, to a musical reinterpretation), such that the fluency of the ongoing production is, at once, enhanced and simplified. In particular, correspondences are systematically established between the coda and onset schemata of contiguous syllables, and processes of reinterpretation are regularly triggered, such that the gestures of such syllables overlap. This overlap can take several forms:

1. some onset gestures are anticipated, and included within the preceding syllable coda (traditionally known as "regressive assimilation" of segments).
2. other coda gestures are expanded into the following syllable onset (traditionally known as "progressive assimilation" of segments).
3. The synsyllabic gestures of an onset-less syllable are anticipated and encompass the edge-syllabic gestures of a preceding syllable, thereby converting a schema that was originally a coda schema into a fused onset schema.
4. The synsyllabic gestures of a syllable may also be anticipated if neighboring coda and onset gestures are perceived as sufficiently similar, causing the coda and onset gestures to blend into a single onset schema.

In addition, if the nuclei of contiguous syllables lack any intervening coda or onset schemata, their rhythmic integration will regularly lead to full syllable blends. Correspondences are systematically established between the adjacent nuclei, and processes of reinterpretation are regularly triggered in a speaker, such that the synsyllabic schemata of these syllables blend in some of the following ways:

1. The inter-syllabic transition becomes very prominent (with an increased syllable prominence ($P_b$), and functions as the central beat of a three beat nuclei, at the center of a novel single blended syllable (with a two vowel "diphthong" nucleus). The previously separated synsyllabic schemata become components of a single compounded synsyllabic schema.
2. If the adjacent syllabic nuclei are not the same, one may swallow the other, or they may lead to the instantiation of a third synsyllabic schema, which results from a partial combination of both.
3. If the adjacent syllabic nuclei are the same, they will fuse and become indistinguishable.

In order to account for syllable blending, it is also necessary to store in the aforementioned syllable database an array for each spectrum produced by syllable blending. Each array includes the upper and lower bounding frequencies of either the onset spectrum or coda spectrum that results from the blending and the upper and lower bounding frequencies of the coda spectrum and onset spectrum that produce the blending. Similarly, to account for synsyllabic schemata blending, an array of the resulting bounding frequencies and the bounding frequencies of the corresponding two posture spectra that produce the blending is also stored.

When a syllable overlap occurs at the juncture of two words, a word blend occurs, and the canonical shape of the participating words becomes significantly blurred, since one word loses a syllable at its edge, and the other word assumes a more complex syllable. When such a syllable blend happens in between two mono-syllabic words, the result is a complete fusion of the adjacent words into a single one, or a word blend (often referred to as a "word contraction"—"you all" vis-à-vis "y'all"—).

In order to account for word blending, a word blending list of all the possible forms each modified word or contracted word may assume and the two words that produced the modification or contraction is also created and stored. In this list the modified or contracted word and the two original words that produced the contraction are stored along with each word represented by a corresponding array of syllables and a word scale.

These processes of syllable blending and word blending will be blocked when the attention of the speaker or listener is concentrated on either of the adjacent syllables or words, that is, when the pertinent prominence scale is manipulated, so that one of the neighboring syllable or word prominence scales ($P_s$ or $P_w$) is increased (by virtue of being "stressed" or a "focalized" intonation). As a consequence, the corresponding syllable or word will be fully and carefully articulated. Likewise, these prominence scale manipulations are willingly triggered, for more or less conventional reasons, but always for meaningful (semantic or pragmatic) purposes.

Figure 10:
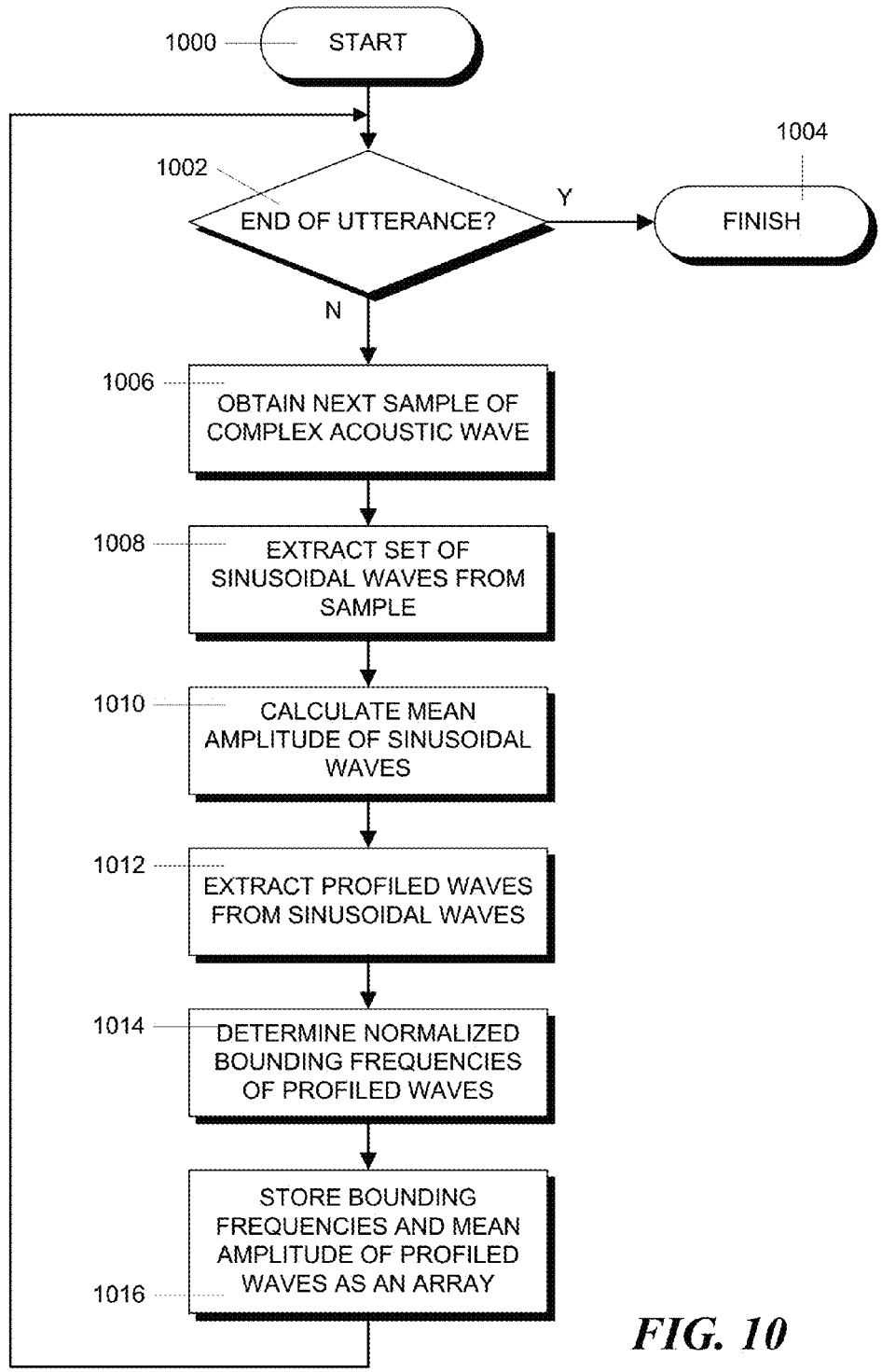
FIG. 10 is a flowchart showing the steps in an illustrative method for processing an electronic speech waveform in a speech recognition method in accordance with the principles of the invention.
Figure 12A:
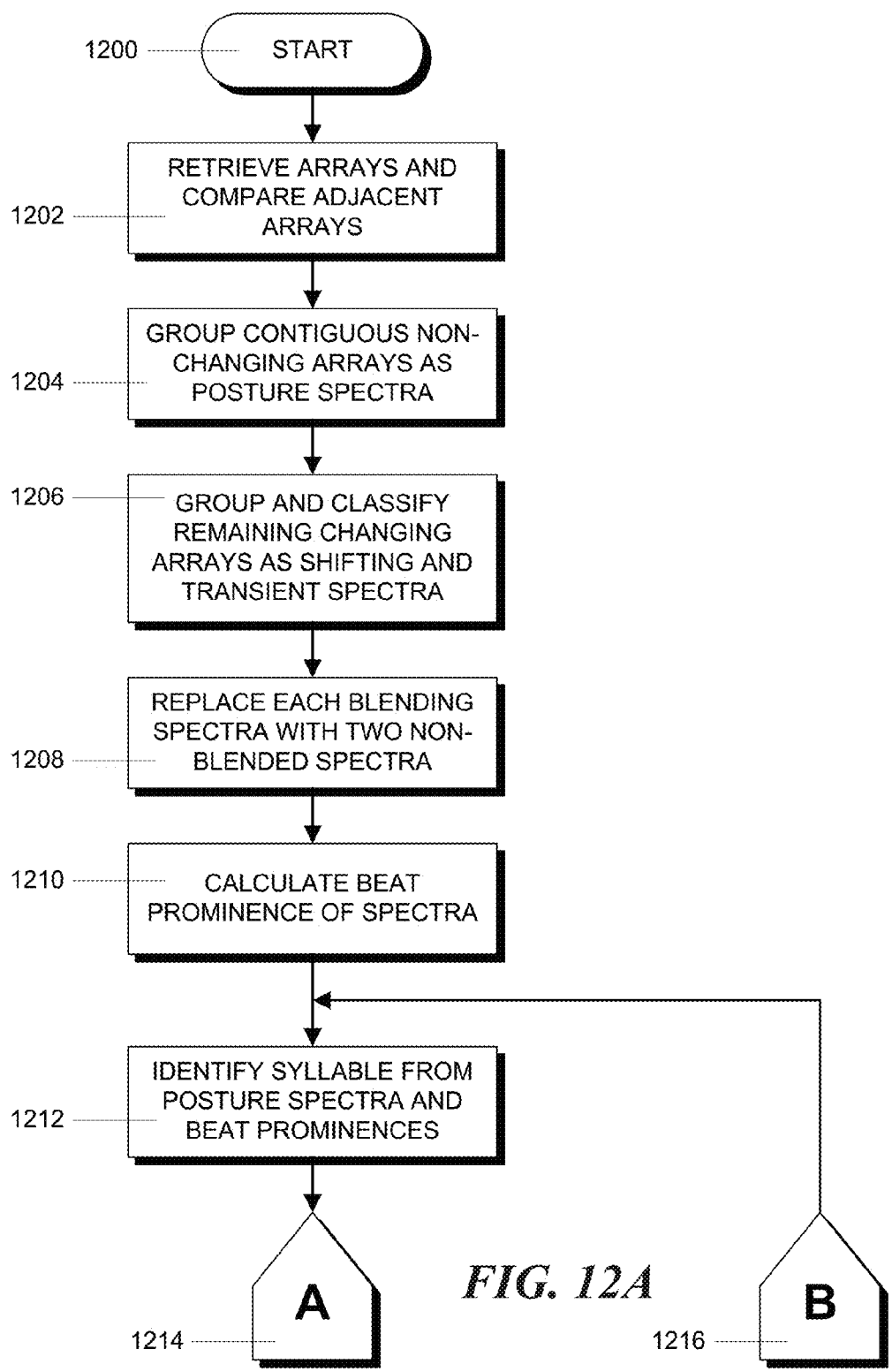
FIGS. 12A and 12B, when placed together, form a flowchart showing the steps in an illustrative process for identifying syllables and words in an utterance.
Figure 12B:
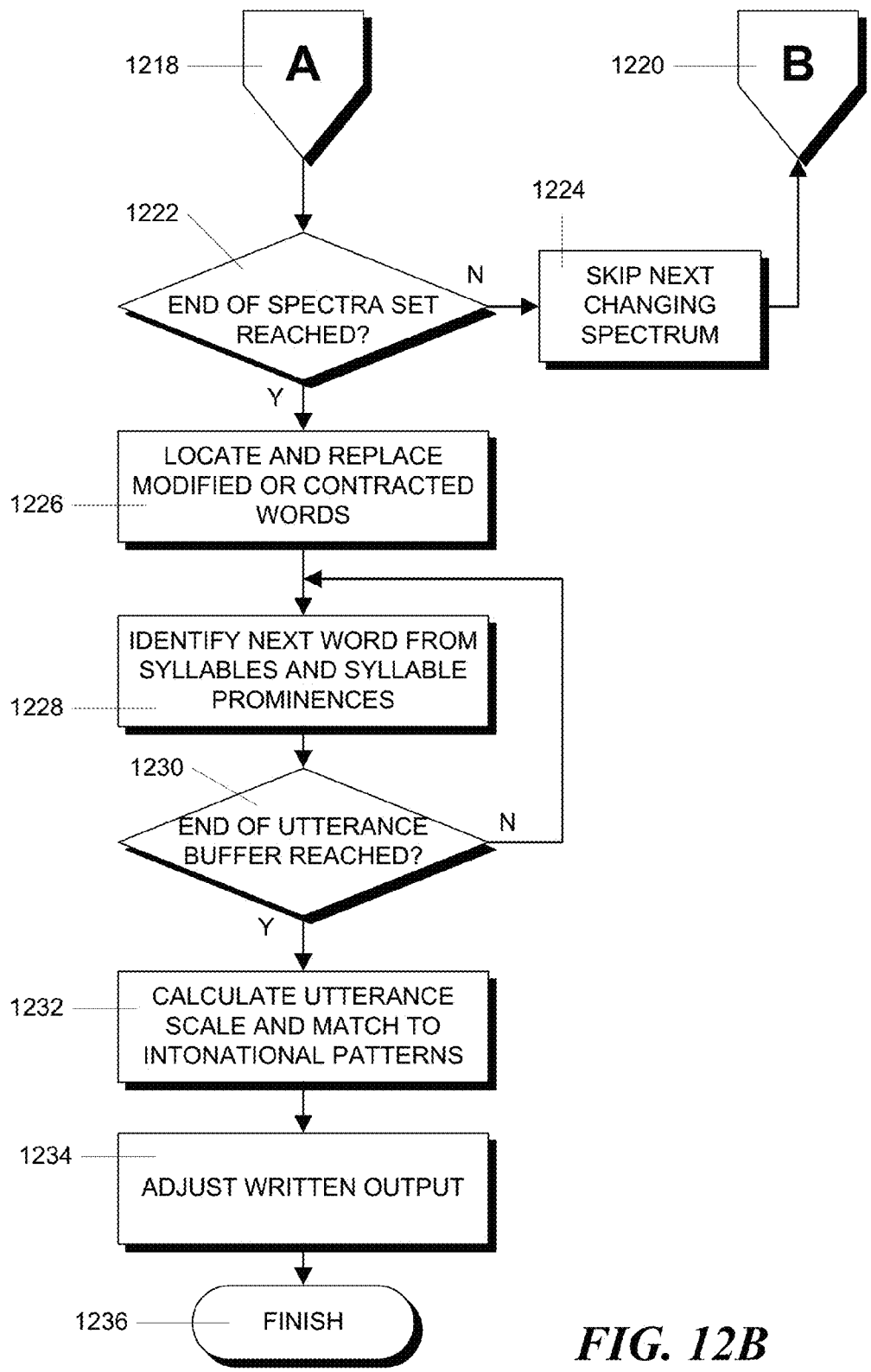

In accordance with one embodiment, the processes and techniques described above may be used in an illustrative speech recognition process that is shown in FIGS. 10, 12A and 12B. As an input this process receives an electronic analog waveform that represents the speech. The waveform is processed, utterance by utterance, by periodically sampling the electronic waveform for each utterance. The process begins in step 1000 and proceeds to step 1002 where a check is made to determine if the end of the utterance being processed has been reached. If not, the process proceeds to step 1006 in which the next sample of the acoustic waveform is obtained.

Then, in step 1008, the sample is frequency processed to extract a set of sinusoidal waves from the sample. Next, in step 1010, the mean amplitude of the sinusoidal waves is calculated.

Figure 11:
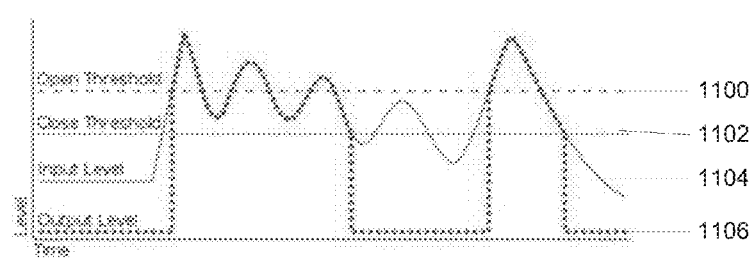
FIG. 11 is a graph illustrating the operation of a noise gate with hysteresis which is used to extract profiled waves from the electronic speech waveform.

In step 1012, profiled waves are extracted from the set of sinusoidal waves by processing each sinusoidal wave with a well-known device, such as a noise gate with hysteresis implemented either in software or hardware. The operation of such a device is shown in FIG. 11. An input waveform 1104 is provided to the device. The device output 1106 is initially zero. When the input waveform 1104 rises above an open threshold 1100, the gate opens and the device output 1106 follows the input waveform 1104. This continues until the input waveform 1104 falls below a close threshold 1102 at which point the output drops to zero. The close threshold 1102 is set here to the mean amplitude calculated in step 1010 and the open threshold 1100 is set slightly higher.

In step 1014, the normalized bounding frequencies of the profiled waves are determined. As discussed above, the upper and lower bounding frequencies of the profiled waves are first determined from the set of profiled waves. Then, the mean pitch of the profiled waves is calculated. The upper and lower bounding frequencies are then divided by the mean pitch and corrected using the deviation factor shown in FIG. 8B.

In step 1016, the normalized bounding frequencies and mean amplitude of the profiled waves in the sample being processed are stored in an array. The process then proceeds back to step 1002 where it is determined whether processing of the utterance is finished. If not, the next sample is obtained in step 1006 and the process is repeated. Alternatively, if in step 1002, it is determined that the end of the utterance has been reached, then the process ends in step 1004.

FIGS. 12A and 12B, when placed together, form a flow chart showing the further processing of the profiled wave arrays that are constructed by the process shown in FIG. 10. This process begins in step 1200 and proceeds to step 1202 where the arrays are retrieved and arrays adjacent in time are compared. Contiguous arrays whose upper and lower bounding frequencies are substantially the same are grouped together in step 1204 and the group is designated as a posture spectrum.

Interspersed among the posture spectra identified in step 1204, the remaining series of changing arrays are grouped in step 1206. Based on the characteristics of the changing frequencies, each group is classified as a shifting spectrum, a scaffolded spectrum or a transient spectrum in accordance with the definitions above.

Next syllabic blends are taken into account in step 1208. This is done by scanning the set of posture and changing spectra for characteristic spectra that indicate a syllabic blend has occurred and each of which was previously stored in the syllable database, as mentioned above. If a characteristic blending spectrum is located, the group corresponding to the blending spectrum is replaced in the set of spectra by the two posture spectra or changing spectra that resulted in the blend and that are stored in the syllable database along with the blended spectrum.

In step 1210 the beat prominences of the spectra groups are calculated by averaging the mean amplitudes stored in the contiguous arrays and using the average as the mean intensity. This processing produces a set of posture spectra interspersed with changing spectra with each posture spectrum and changing spectrum having a calculated beat prominence.

In step 1212, the set of posture and changing spectra along with their beat prominences are matched to the syllable arrays stored in the syllable database as described above to identify syllables. For the first syllable, this process proceeds by selecting a minimum sequence (determined by the language) of posture and changing spectra from the set starting from the spectrum that begins the utterance. The bounding frequency values and beat prominences in this sequence are then compared against the equivalent values in the stored syllable arrays. This could be a direct comparison or the sequence could be used as a key into a database. If no match is found, the next changing spectrum (if present) and posture spectrum from the spectra set is added to the right end of the sequence and the matching process repeated. This routine is repeated until a syllable is identified, from its initial to its final posture spectrum and characteristic beat prominence scale. In some cases, after this process produces a match with a syllable that has a final nucleus, a following transitional spectrum is left stranded at the end of the utterance, or as un-attachable to a following syllable with an onset of its own. This transitional spectrum is re-examined and, if it is a coda spectrum it is added to the right end of the sequence and the process is repeated.

As a syllable is identified, its written tag (or in some cases where there is ambiguity, the written tag plus alternative tags) stored in the syllable database with the syllable array is appended to an utterance buffer, according to the conventions of the output required by the pertinent writing system. Also, the syllable prominence is calculated in accordance with the formula discussed above and added to the utterance buffer in association with the tag. Alternatively, if no syllable is identified during this process accurate onset, nucleus, and coda schemata are still obtained and may be used to update the syllable database.

The process then proceeds, via off-page connectors 1214 and 1218 to step 1222 where a check is then to determine whether the end of the spectra set has been reached.

If it is determined in step 1222 that the end of the spectra set has not been reached, then, in step 1224, the changing spectrum following the posture spectrum ending the syllable is skipped and the process returns, via off-page connectors 1220 and 1216 to step 1212 to process the next syllable. For syllables following the first syllable, this process proceeds by again selecting a minimum sequence of posture and changing spectra from the set starting from the posture spectrum following the changing spectrum skipped in step 1224.

Operation continues in this manner with steps 1212, 1222 and 1224 being sequentially executed until the end of the spectra set is reached as determined in step 1222. The process then proceeds to step 1226 where word blending is processed. In this process, the utterance buffer is scanned for modified and contracted words using the list of syllables and word scales previously stored for such words in the word blending list. If a modified or contracted word is located, the syllables and corresponding word scale associated with it are replaced by the syllables and corresponding scales of the two words that produced the modification or contraction.

Next, in step 1228, the inventory of word syllable/word scale arrays previously stored in the word database is matched against the syllables and syllable prominence values in the utterance buffer. For the first word, this process proceeds by selecting a minimum sequence (determined by the language) of syllables from the utterance buffer starting from with the syllable that begins the utterance. The word scale is then computed from the syllable prominence values stored with the syllables and the syllables and word scale for this sequence are then compared against the equivalent values in the word arrays stored in the word database (as before either as a direct comparison or by using the sequence as a key). If no match is found, the next syllable from the utterance buffer is added to the right end of the sequence, the word prominence recalculated and the matching process repeated. This routine is repeated until a word is identified, from its syllables and characteristic word scale. When a match is found, the written word from the matching word array is appended to an output buffer along with the calculated word scale. Alternatively, if no word is identified during this process an accurate syllable sequence and prominence scale are still obtained and may be used to update the word database.

The process then proceeds to step 1230 where a determination is made whether the end of the utterance buffer has been reached. If it is determined in step 1230 that the end of the utterance buffer has not been reached, then the process returns to step 1228 to process the next word. For words following the first word, this process proceeds by again selecting a minimum sequence of syllables from the utterance buffer starting from the syllable following the last syllable in the previously-identified word.

Operation continues in this manner with steps 1228 and 1230 being sequentially executed until the end of the utterance buffer is reached as determined in step 1230. The process then proceeds to step 1232 where the utterance scale of the identified words in the output buffer is calculated from the word scales stored in the output buffer in accordance with the formula set forth above. The calculated utterance scale is then matched against a matrix of intonational patterns, allowing an identification of the type of utterance (interrogative, imperative, etc.). Alternatively, if no utterance is identified during this process an accurate word sequence and prominence scale are still obtained and may be used to update the matrix. In step 1234, the written words in the output buffer are adjusted accordingly, accompanied by the additional characters that may be pertinent, if any. The process then finishes in step 1236.

Figure 13A:
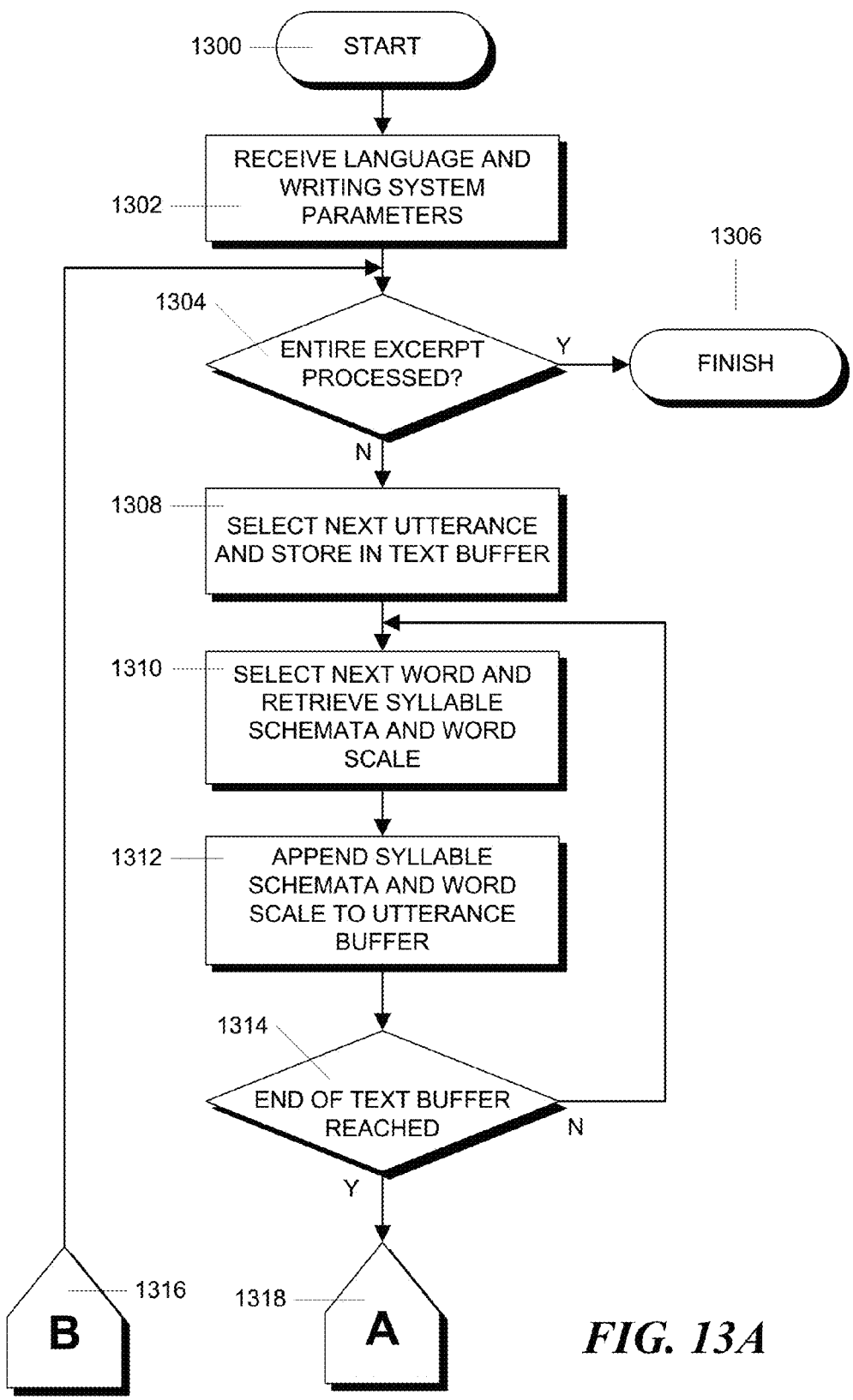
FIGS. 13A and 13B, when placed together, form a flowchart showing the steps in an illustrative speech synthesis process in accordance with the principles of the present invention.
Figure 13B:
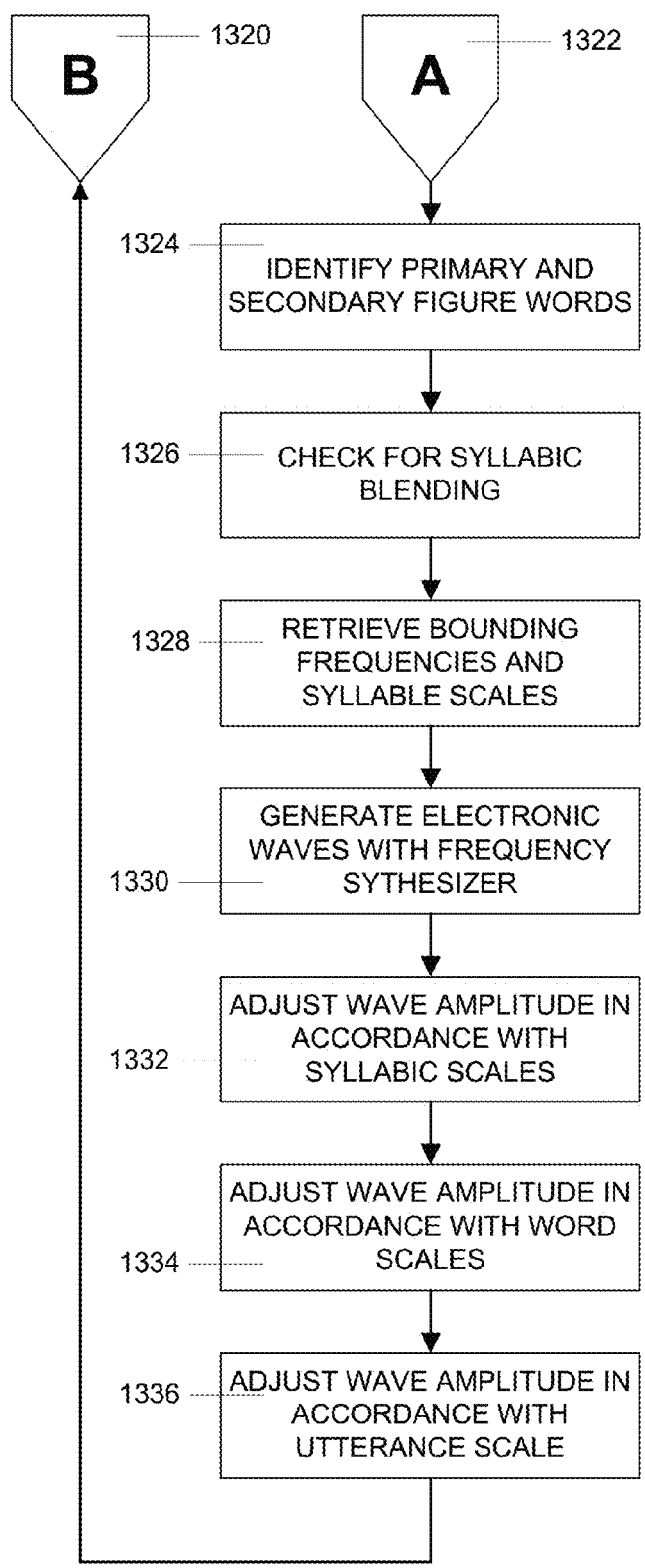

An illustrative process for speech synthesis is shown in FIGS. 13A and 13B, when placed together. This process synthesizes speech from a text excerpt stored in a conventional electronic text file. The process begins in step 1300 and proceeds to step 1302 where parameters indicating the language and the writing system of the text excerpt are received by the system.

Next, in step 1304, a determination is made whether the entire text excerpt has been processed. If it has not, the process proceeds to step 1308 where the next complete written utterance is selected from the text excerpt as determined by the conventions of the selected written language and stored in a text buffer. For example, the utterance might be a sentence as delineated by a punctuation character, such as a period.

Next, in step 1310, the next written word is selected from the word buffer. This may be done in a conventional manner by examining the word buffer for "stop" characters, such as spaces, commas, colons and semicolons that delineate the words. The selected word is then used to access the aforementioned word blending list to determine if it is a modified or contracted word. If the word is not a modified or contracted word it is used to access the word database to retrieve its corresponding syllables and word scale. Alternatively, if the selected word is a modified or contracted word, the syllable schemata and word scales of the two associated words are retrieved from the word blending list. In step 1312, the retrieved syllable schemata and word scale(s) are appended to the end of the utterance buffer.

A check is then made in step 1314 whether the end of the text buffer has been reached. If not, the process proceeds back to step 1310 where the next word in the text buffer is selected for processing. Processing proceeds in this manner with steps 1310, 1312 and 1314 being repeated until it is determined in step 1314 that the end of the text buffer has been reached. The process then proceeds, via off-page connectors 1318 and 1322 to step 1324 where one or two words are identified with the primary and secondary figures of the utterance. The location within the utterance of these words may be inferred from text characters that identify an utterance type, or intonational pattern (such as question marks, interrogation marks, commas, etc.) or the utterance scale may be stipulated in advance.

Then, in step 1326, the syllable schemata at the end of each word and the beginning of the next word are used to access the syllable database to determine whether syllabic blending is triggered. If the two syllabic schemata and accompanying word scales are found in the syllable database, they are replaced by the associated blended syllable schemata and word scale. The words identified in step 1324 as the primary and secondary figures above block or limit these blending processes, as described above.

In step 1328, the resulting sequence of syllables is used to access the syllable database and retrieve the upper and lower bounding frequencies for each syllable and the corresponding syllable scale. The upper and lower bounding frequencies can be scaled as desired by changing the means pitch and using the deviation curve shown in FIG. 8B if the speech is to be identified with a desired gender, body type etc.

In step 1330, a set of electronic waves are generated a frequency synthesizer for each harmonic posture. These electronic waves have frequencies that lie between upper and lower bounding frequencies and are generated with a pseudo-harmonic repetitive patterns. For each inharmonic posture, set of electronic waves are generated with a frequency synthesizer with frequencies that lie between upper and lower bounding frequencies and simulate white noise. For postures that correspond to voiced fricatives or nasals the synthesized waves can be a mixture of pseudo-harmonic repetitive patterns and noise.

In step 1332, the relative amplitudes of the waves are adjusted for each syllable in accordance with the syllable scale retrieved for that syllable and, in step 1334, the amplitudes are further adjusted in accordance with the retrieved word scales. Finally, processing of the utterance is completed in step 1336 by adjusting the electronic wave amplitudes in accordance with the utterance scale for the utterance. The process then returns via off-page connectors 1320 and 1316 to step 1304 to determine whether the entire text excerpt has been processed. If not then the process continues by selecting the next utterance in step 1308 and performing steps 1310-1336 on the newly selected utterance. When the entire text excerpt has been processed as determined in step 1304, the process finishes in step 1306. The resulting electronic waveform can then be played through a conventional sound reproduction system to generate the synthesized speech.

Both the speech recognition process illustrated in FIGS. 10 and 12A and 12B and the speech synthesis process illustrated in FIGS. 13A and 13B can be implemented by software in a conventional digital computer. Alternatively, these processes may be implemented in firmware or hardware in a convention fashion.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A speech-recognition method that improves computer function by improving machine-recognition of a series of words in an electronic waveform derived from an utterance, which waveform is expressed as a time series of samples, each sample including data defining a frequency spectrum, comprising automatically with a computer recognizing words in the utterance by:
- (a) using the series of frequency spectra to divide the waveform into time segments during which the frequency spectra are stable, herein referred to as posture spectra beats, and time segments during which the frequency spectra are changing between consecutive posture spectra beats, herein referred to as changing spectra beats;
- (b) calculating a beat prominence for each of the beats detected in part (a), wherein beat prominence depends on beat duration and mean amplitude for the portion of the waveform having amplitude above an amplitude threshold;
- (c) identifying syllables within the waveform by comparing the sequence of detected beats and associated beat prominences to first prestored data indicating, for each of a predefined set of possible syllables, expected patterns of posture spectra beats and changing spectra beats, and their associated beat prominences;
- (d) for each identified syllable, calculating a syllable prominence from at least some beat prominences of the beats within the syllable;
- (e) identifying words within the waveform by comparing the sequence of identified syllables and associated syllable prominences to second prestored data indicating, for each of a predefined set of possible words, expected patterns of syllables and their associated syllable prominences; and
- (f) storing electronically in an output buffer, in a form suitable for use in a speech-recognition application, a series of data entries indicating words identified within the waveform derived from the utterance.

2. The method of claim 1 wherein part (b) comprises calculating beat prominence for each of the beats as the mean amplitude multiplied by the beat duration.

3. The method of claim 1 wherein part (f) further comprises storing, as at least one of the data entries, a data entry indicating at least one full word in response to identification in part (e) of a modified word or contracted words associated with the at least one full word.

4. The method of claim 1 further comprising, for each word, calculating a word prominence from at least some of the syllable prominences of the syllables within the word.

5. The method of claim 4 further comprising comparing the sequence of word prominences to prestored data defining a plurality of intonational patterns to identify an utterance type.

6. The method of claim 1 wherein the amplitude threshold is based on a calculated mean amplitude of the waveform over time.

7. The method of claim 1 wherein the series of frequency spectra is limited to profiled waveforms in a frequency band defined by a high bounding frequency and a low bounding frequency, and further comprising normalizing the series of frequency spectra.

8. A computer system having improved speech-recognition capabilities, programmed to recognize a series of words in an electronic waveform derived from an utterance, which waveform is expressed as a time series of samples, each sample including data defining a frequency spectrum, wherein the computer system comprises a digital computer, a data buffer, and stored speech-recognition software instructions structured to direct the computer to automatically:
- (a) use the series of frequency spectra to divide the waveform into time segments during which the frequency spectra are stable, herein referred to as posture spectra beats, and time segments during which the frequency spectra are changing between consecutive posture spectra beats, herein referred to as changing spectra beats;
- (b) calculate a beat prominence for each of the beats detected in part (a), wherein beat prominence depends on beat duration and mean amplitude for the portion of the waveform having amplitude above an amplitude threshold;
- (c) identify syllables within the waveform by comparing the sequence of detected beats and associated beat prominences to first prestored data indicating, for each of a predefined set of possible syllables, expected patterns of posture spectra beats and changing spectra beats, and their associated beat prominences;
- (d) for each identified syllable, calculate a syllable prominence from at least some beat prominences of the beats within the syllable;
- (e) identify words within the waveform by comparing the sequence of identified syllables and associated syllable prominences to second prestored data indicating, for each of a predefined set of possible words, expected patterns of syllables and their associated syllable prominences; and
- (f) store electronically in the output buffer, in a form suitable for use in a speech-recognition application, a series of data entries indicating words identified within the waveform derived from the utterance.

9. The computer system of claim 8 wherein part (b) comprises calculating beat prominence for each of the beats as the mean amplitude multiplied by the beat duration.

10. The computer system of claim 8 wherein part (f) further comprises storing, as at least one of the data entries, a data entry indicating at least one full word in response to identification in part (e) of a modified word or contracted words associated with the at least one full word.

11. The computer system of claim 8 wherein the stored software instructions further comprise instructions, for each word, to calculate a word prominence from at least some of the syllable prominences of the syllables within the word.

12. The computer system of claim 11 wherein the stored software instructions further comprise instructions to compare the sequence of word prominences to prestored data defining a plurality of intonational patterns to identify an utterance type.

13. The computer system of claim 8 wherein the amplitude threshold is based on a calculated mean amplitude of the waveform over time.

14. The computer system of claim 8 wherein the series of frequency spectra is limited to profiled waveforms in a frequency band defined by a high bounding frequency and a low bounding frequency, and wherein the stored software instructions further comprise instructions to normalize the series of frequency spectra.

* * * * *